United States Patent
Tsunetomo et al.

(10) Patent No.: US 10,917,536 B2
(45) Date of Patent: Feb. 9, 2021

(54) IMAGE SENSOR UNIT AND IMAGE READING DEVICE

(71) Applicant: Nippon Sheet Glass Company, Limited, Tokyo (JP)

(72) Inventors: Keiji Tsunetomo, Kanagawa (JP); Satoru Kusaka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 16/575,507

(22) Filed: Sep. 19, 2019

(65) Prior Publication Data

US 2020/0014813 A1     Jan. 9, 2020

Related U.S. Application Data

(63) Continuation of application No. PCT/JP2018/010430, filed on Mar. 16, 2018.

(30) Foreign Application Priority Data

Mar. 24, 2017   (JP) ................................ 2017-059767

(51) Int. Cl.
*H04N 1/00*   (2006.01)
*H04N 1/028*   (2006.01)
(Continued)

(52) U.S. Cl.
CPC ..... *H04N 1/02885* (2013.01); *H04N 1/02845* (2013.01); *H04N 1/02895* (2013.01); *H04N 1/0306* (2013.01); *G02B 5/1814* (2013.01)

(58) Field of Classification Search
CPC ......................... H04N 1/02885; H04N 1/02845
See application file for complete search history.

(56) References Cited

U.S. PATENT DOCUMENTS 4,560,863 A * 12/1985 Matsumura ............ G02B 7/343
                                                                    250/201.2
5,481,381 A *  1/1996 Fujimoto ................ H04N 1/488
                                                                    250/237 R
(Continued)

FOREIGN PATENT DOCUMENTS

CN      102608680 A      7/2012
CN      103782216 A      5/2014
(Continued)

OTHER PUBLICATIONS

International Preliminary Report on Patentability with the translation of Written Opinion dated Oct. 3, 2019, issued by the International Bureau in corresponding application No. PCT/JP2018/010430.

(Continued)

*Primary Examiner* — Ibrahim Siddo
(74) *Attorney, Agent, or Firm* — Sughrue Mion, PLLC

(57) ABSTRACT

An image sensor unit includes: a linear light source that illuminates a document with a light; a first erecting equal-magnification lens array and a second erecting equal-magnification lens array arranged in the stated order away from the document so as to receive a light reflected from the document and form an erecting equal-magnification image; a slit provided on an intermediate imaging plane between the first erecting equal-magnification lens array and the second erecting equal-magnification lens array; a diffraction grating that disperses a light output from the second erecting equal-magnification lens array; and a linear image sensor that receives a light dispersed by the diffraction grating.

7 Claims, 23 Drawing Sheets

(51) Int. Cl.
    *H04N 1/03*      (2006.01)
    *G02B 5/18*      (2006.01)

(56)            References Cited

U.S. PATENT DOCUMENTS 8,681,397 B2    3/2014  Kusaka et al.
 2002/0028011 A1    3/2002  Yasuda

FOREIGN PATENT DOCUMENTS

| | | |
|---|---|---|
| CN | 203825370 U | 9/2014 |
| EP | 0 383 308 A2 | 8/1990 |
| JP | 62-178922 A | 8/1987 |
| JP | 2002-218158 A | 8/2002 |
| JP | 2007-306154 A | 11/2007 |
| JP | 4844225 B2 | 12/2011 |
| JP | 2013228625 A | 11/2013 |
| JP | 2017017391 A | 1/2017 |

OTHER PUBLICATIONS

International Search Report dated May 15, 2018, issued by the International Searching Authority in corresponding application No. PCT/JP2018/010430.
Communication dated Nov. 19, 2020 by the European Patent Office in application No. 18771208.8.
Communication dated Nov. 20, 2020 by the State Intellectual Property Office of People's Republic of China in application No. 201880020265.4.

* cited by examiner

| SLIT WIDTH w (μm) | $W_A$ (μm) | $W_B$ (μm) | $W_B / W_A$ |
|---|---|---|---|
| 50 | 59 | 114 | 1.93 |
| 75 | 85 | 113 | 1.33 |
| 100 | 115 | 102 | 0.89 |
| 125 | 144 | 123 | 0.85 |

FIG. 22

| | | |
|---|---|---|
| FIRST SURFACE LIGHT SHIELDING WALL HEIGHT | | 0.7 |
| SECOND-THIRD SURFACE LIGHT SHIELDING WALL HEIGHT | | 0.85 |
| FOURTH SURFACE LIGHT SHIELDING WALL HEIGHT | | 0.7 |
| FIRST SURFACE LIGHT SHIELDING WALL OPENING DIAMETER | | 0.45 |
| FOURTH SURFACE LIGHT SHIELDING WALL OPENING DIAMETER | | 0.45 |
| FIRST SURFACE LENS EFFECTIVE DIAMETER | | 0.57 |
| SECOND SURFACE LENS EFFECTIVE DIAMETER | | 0.4 |
| THIRD SURFACE LENS EFFECTIVE DIAMETER | | 0.4 |
| FOURTH SURFACE LENS EFFECTIVE DIAMETER | | 0.57 |
| FIRST SURFACE LENS AND FOURTH SURFACE LENS | R | 0.558061 |
| | AD | −1.30729 |
| | AE | −1.59269 |
| | AF | 5.671444 |
| | AG | −25.8786 |
| SECOND SURFACE LENS AND THIRD SURFACE LENS | R | 0.406361 |
| | AD | −4.62368 |
| | AE | 0.656189 |
| | AF | −101.384 |
| | AG | 448.7182 |

IMAGE SENSOR UNIT AND IMAGE READING DEVICE

BACKGROUND OF THE INVENTION

1. Field of the Invention

The present invention relates to an image sensor unit and an image reading device in which the image sensor unit is used.

2. Description of the Related Art

Some image reading devices such as scanners are known to use an erecting equal-magnification imaging system. The use of an erecting equal-magnification imaging system can reduce the size of the image sensor unit better than reduction imaging optical systems. An image sensor unit using an erecting equal-magnification imaging system is primarily comprised of a linear light source, an erecting equal-magnification lens array, and a linear image sensor.

An erecting equal-magnification imaging system is exemplified by a SELFOC lens array (hereinafter, SLA, SELFOC is a registered trademark of Nippon Sheet Glass Co. Ltd.), which is a form of rod lens array including a large number of rod lenses arranged in the main scanning direction and integrated with each other, each of the rod lenses being embodied by a columnar graded index glass rod having a higher refraction index at the center. Other known examples include a resin rod lens array including a large number of similarly graded index rod lenses with a graded index inside arranged and integrated with each other, and a lens array plate or a stack thereof produced by forming a large number of convex lenses on the surface of a dielectric substrate plate.

In a color image sensor unit for reading a color image, on-chip filters for RGB, etc. are formed on the sensor surface in order to provide a signal output from the light receiving device with color information. In the related art, there is proposed a method whereby a spectral device such as a diffraction grating is provided in front of the sensor surface to separate the light into the RGB colors, and the lights subjected to color separation are caused to be incident on the R (red), G (green), and B (blue) light receiving devices, respectively (see, for example, patent literature 1).
[patent document 1] JP2002-218158

SUMMARY OF THE INVENTION

In actual erecting equal-magnification imaging systems, however, there is a visual field of a certain size. Therefore, each of the R, G, B lights may arrive at the light receiving device of another color with a certain light intensity distribution (such a state is referred to as "color mixture") with the result that the resolution may be lowered, if a spectral device is merely provided in front of the sensor surface.

The present invention addresses the above-described issue, and a general purpose thereof is to provide a technology of preventing, in an image sensor unit including a color separation optical system, the light dispersed from producing color mixture on the sensor surface.

An image sensor unit according to an embodiment of the present invention includes: a linear light source that illuminates a document with a light; a first erecting equal-magnification lens array and a second erecting equal-magnification lens array arranged in the stated order away from the document so as to receive a light reflected from the document and form an erecting equal-magnification image; a visual field restriction device provided on an intermediate imaging plane between the first erecting equal-magnification lens array and the second erecting equal-magnification lens array; a spectral device that disperses a light output from the second erecting equal-magnification lens array; and a linear image sensor that receives a light dispersed by the spectral device.

Given that a direction of arrangement of single lenses forming the erecting equal-magnification lens arrays is defined as a main scanning direction and a direction perpendicular to the main scanning direction is defined as a sub-scanning direction, the visual field restriction device is configured to restrict a visual field on the intermediate imaging plane in the sub-scanning direction.

The visual field restriction device may be comprised of a slit that extends in the main scanning direction and has a predetermined width in the sub-scanning direction.

The visual field restriction device may be comprised of a mirror that extends in the main scanning direction and has a predetermined width in the sub-scanning direction. In this case, the first erecting equal-magnification lens array and the second erecting equal-magnification lens array may be arranged such that an angle formed by the respective optical axes is a predetermined angle.

The linear light source outputs a light with a first wavelength at first point of time and outputs a light with a second wavelength different from the first wavelength at a second point of time.

Another embodiment of the present invention relates to an image reading device. The image reading device includes: the image sensor unit as defined above; and an image processing unit that processes data detected by the image sensor unit.

Optional combinations of the aforementioned constituting elements, and implementations of the invention in the form of methods, apparatuses, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 22 shows a specification of the dimension of the erecting equal-magnification lens array plate used in the simulation;

MODE FOR CARRYING OUT THE INVENTION

Figure 1:
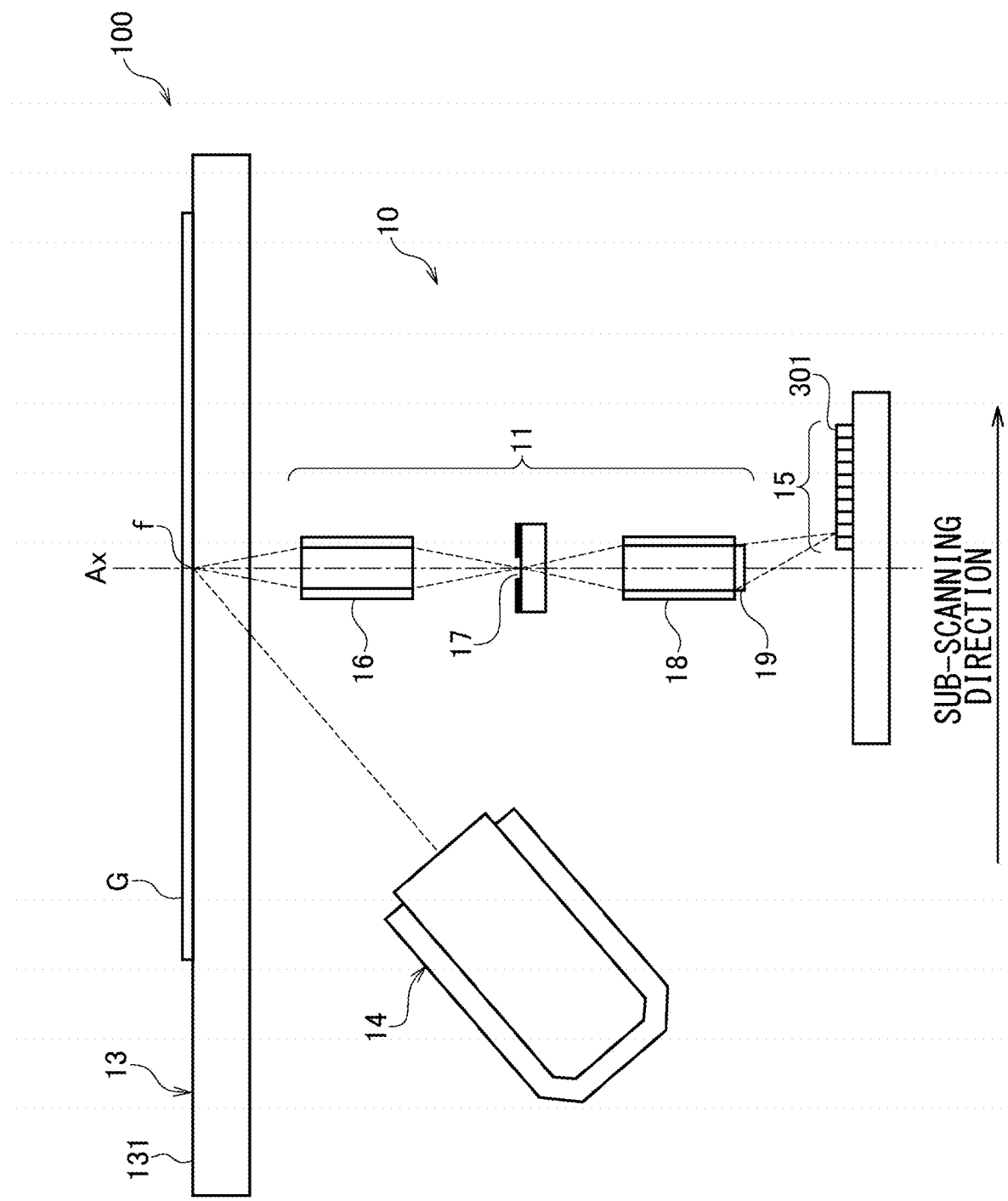
FIG. 1 shows an image reading device in which an image sensor unit according to the embodiment of the present invention is used.

FIG. 1 shows an image reading device 100 in which an image sensor unit 10 according to the embodiment of the present invention is used. The image sensor unit 10 according to the embodiment is an image sensor unit including a color separation optical system. The image sensor unit 10 is elongated in a direction perpendicular to the paper surface, and FIG. 1 shows a cross section of the image sensor unit 10 revealed by cutting the image sensor unit 10 by a plane parallel to the paper surface. As shown in FIG. 1, the image reading device 100 includes an image sensor unit 10, a plate glass document table 13 configured to support a document G on a top surface 131, a driving mechanism (not shown) for driving the image sensor unit 10 for scanning, and an image processing unit (not shown) for processing data read by the image sensor unit 10.

The image sensor unit 10 includes a linear light source 14 for illuminating the document G placed on the plate glass document table 13, an erecting equal-magnification imaging system 11 for condensing a light reflected from the document G, a linear image sensor 15 for receiving a light condensed by the erecting equal-magnification imaging system 11, and a housing (not shown) that fixes these components. The linear light source 14, the erecting equal-magnification imaging system 11, and the linear image sensor 15 are fixed by the housing (not shown) so as to maintain predetermined relative positions.

Figure 26:
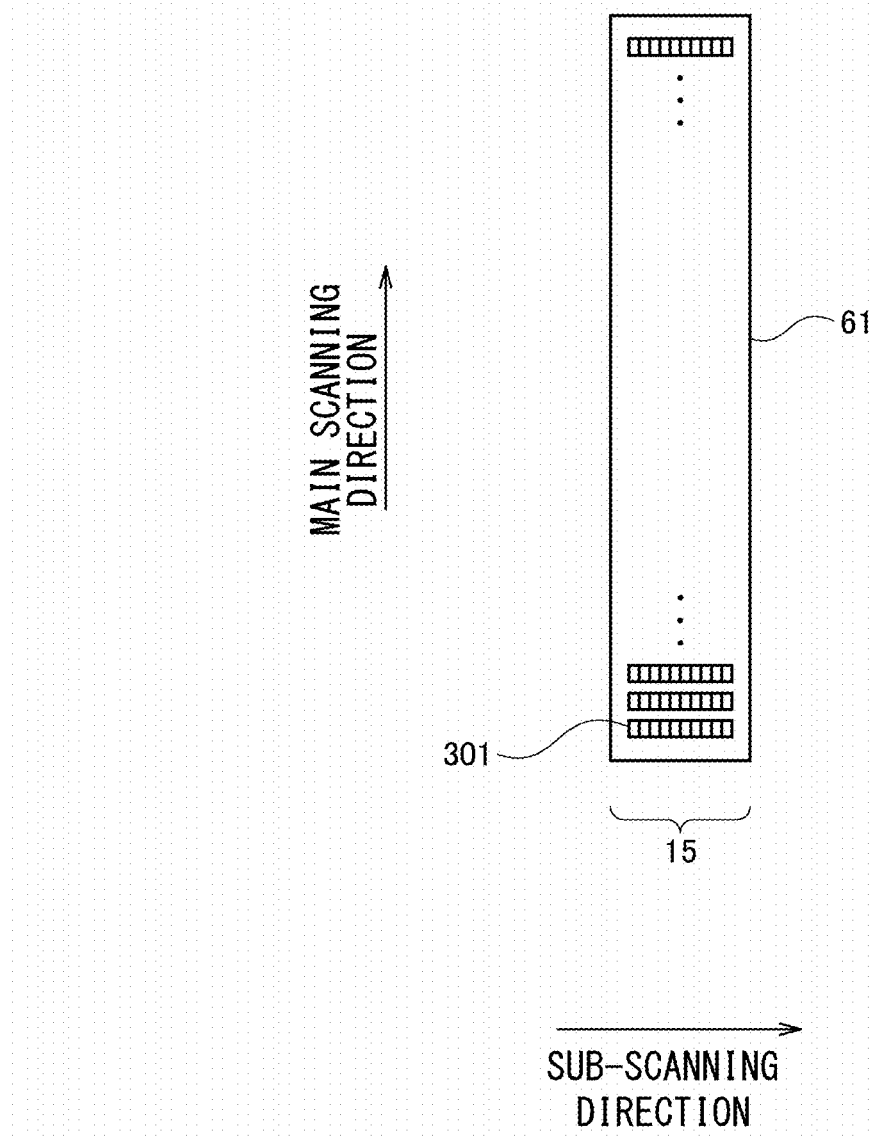
FIG. 26 is a schematic view of the sensor surface of the linear image sensor.

Referring to FIG. 1, the direction of the arrow (the direction parallel to the paper surface) represents the sub-scanning direction, and the direction perpendicular to the sub-scanning direction (the direction perpendicular to the paper surface) is the main scanning direction. The linear light source 14 is elongated in the main scanning direction and illuminates the document G line by line along the main scanning direction. The linear light source 14 may emit lights with three wavelengths (e.g., 650 nm, 550 nm, and 450 nm) corresponding to the RGB colors. As described in FIG. 16, the linear image sensor 15 may be configured such that a plurality of light receiving devices (photoelectric transducer) 301 are arranged in a tile pattern along the main scanning direction and the sub-scanning direction on a sensor surface of a substrate 61 elongated in the main scanning direction, and such that the longitudinal direction of the arrangement is parallel to the main scanning direction. Referring to FIG. 26, ten light receiving devices (photoelectric transducers) 301 are arranged in the sub-scanning direction. The arrangement may not be as illustrated provided that as many devices as the number of colors sought to be separated in one sitting or more are arranged. The light receiving device (photoelectric transducer) 301 may be configured such that on-chip filters corresponding to the RGB colors are formed on the surface.

The optical axis Ax of the erecting equal-magnification imaging system 11 is arranged to be perpendicular to the principal surface of the plate glass document table 13. Further, the linear light source 14 is arranged such that the illumination light illuminates an area F including an intersection f between the optical axis Ax of the erecting equal-magnification imaging system 11 and the top surface 131 of the plate glass document table 13 evenly and most brightly. Further, the linear image sensor 15 is arranged such that the sensor surface (light receiving surface) is positioned on the ultimate imaging plane of the erecting equal-magnification imaging system 11.

In the image sensor unit 10 configured as described above, the document G is read by causing the illuminating light from the linear light source 14 to irradiate the document G via the plate glass document table 13, and causing the erecting equal-magnification imaging system 11 to condense the light reflected from the document G to form an image on the linear image sensor 15. The light reflecting area on the document G can be considered as a virtual light source that outputs a linear light. The image reading device 100 can read a desired area on the document G by scanning the document G with the image sensor unit 10 in the sub-scanning direction.

As shown in FIG. 1, the erecting equal-magnification imaging system 11 according to the embodiment is provided with a first erecting equal-magnification lens array 16, a slit 17, a second erecting equal-magnification lens array 18, and a diffraction grating 19 in the stated order away from the document.

In this embodiment, the first erecting equal-magnification lens array 16 on the document side (object side) and the second erecting equal-magnification lens array 18 on the side of the sensor (image plane side) are SELFOC lens arrays (SLA) including a large number of rod lenses arranged in the main scanning direction and integrated with each other. The first erecting equal-magnification lens array 16 and the second erecting equal-magnification lens array 18 are arranged in a series such that the optical axes of the respective rod lenses are aligned to receive the light reflected from the document G and to form an erecting equal-magnification image of the document G on the ultimate imaging plane (the sensor surface of the linear image sensor 15).

The erecting equal-magnification image of the document G is formed on an intermediate plane (the intermediate plane will be referred to as "intermediate imaging plane") between the first erecting equal-magnification lens array 16 and the second erecting equal-magnification lens array 18. The first erecting equal-magnification lens array 16 and the second erecting equal-magnification lens array 18 are designed for an arrangement $L_0=L_3=1/2L_2$, where $L_0$ denotes the optical distance between the document surface and the document side end face of the first erecting equal-magnification lens array 16, $L_2$ denotes the optical distance between the sensor surface side end face of the first erecting equal-magnification lens array 16 and the document side end face of the second erecting equal-magnification lens array 18, and $L_3$ denotes the optical distance between the sensor surface side end face of the second erecting equal-magnification lens array 18 and the sensor surface.

The diffraction grating 19 functions as a spectral device that disperses the light output from the second erecting equal-magnification lens array 18 in the sub-scanning direction. The light including a mixture of the RGB colors output from the read area on the document G is subject to RGB color separation by the diffraction grating 19 and is guided toward the sensor surface of the linear image sensor 15. The diffraction grating 19 is provided between the second erecting equal-magnification lens array 18 and the linear image sensor 15. For example, the diffraction grating 19 may be provided immediately after the second erecting equal-magnification lens array 18 as shown in FIG. 1. The diffraction grating 19 may be a blazed transmission grating that maximizes the intensity of the primary diffracted light. In order to receive the primary diffracted light from the diffraction grating 19 suitably, the linear image sensor 15 is arranged at a position displaced from the optical axis Ax of the erecting equal-magnification imaging system 11 that occurs when the diffraction grating 19 is not provided in FIG. 1.

In the image sensor unit 10 according to the embodiment, the slit 17 is provided on the intermediate imaging plane. The slit 17 extends in the main scanning direction and has a predetermined width in the sub-scanning direction. The slit 17 functions as a visual field restriction device that restricts the visual field on the intermediate imaging plane in the sub-scanning direction. The direction of arrangement of the plurality of single lenses (i.e., the rod lenses) forming the first erecting equal-magnification lens array 16 and the second erecting equal-magnification lens array 18 is the main scanning direction, and the direction perpendicular to the main scanning direction is the sub-scanning direction. The slit 17 may be formed by forming a light-shielding film on a portion of the surface of the transparent substrate made of glass, etc. The visual field restriction device may limit or control the luminous flux or aperture.

Since the erecting equal-magnification image of the document G is formed on the intermediate imaging plane, overlapping of the dispersed light on the sensor surface (i.e., color mixture) is prevented by restricting the visual field in the sub-scanning direction by the slit 17.

The slit like this can restrict the visual field in the sub-scanning direction and inhibit color mixture on the sensor surface equally when the slit is provided on the document surface or immediately after thereof. However, the device configuration makes it difficult to actually provide the slit on the document surface. The plate glass document table 13 is provided immediately after the document and so it is not easy to provide the slit there as well. Depending on the method of arranging the slit, the light directed to the document G from the linear light source 14 may be blocked. Since a driving mechanism (a rail, etc.) for driving the image sensor unit 10 for scanning need to be provided near the document surface, it is not realistic to provide the slit on the document surface or immediately after thereof.

A movable part such as a driving mechanism is not located on the intermediate imaging plane between the first erecting equal-magnification lens array 16 and the second erecting equal-magnification lens array 18, and the intermediate imaging plane is substantially equivalent to the document surface. Therefore, the provision of the slit 17 on the intermediate imaging plane in this embodiment inhibits color mixture on the sensor surface as in the case of providing the slit on the document surface or immediately after the document, without causing the inconvenience as described above.

A description will now be given of the advantage of inhibiting color mixture using the image sensor unit 10 according to the embodiment. Before describing the embodiment, a description will be given of how color mixture is produced on the sensor surface in several comparative examples.

First Comparative Example

Figure 2:
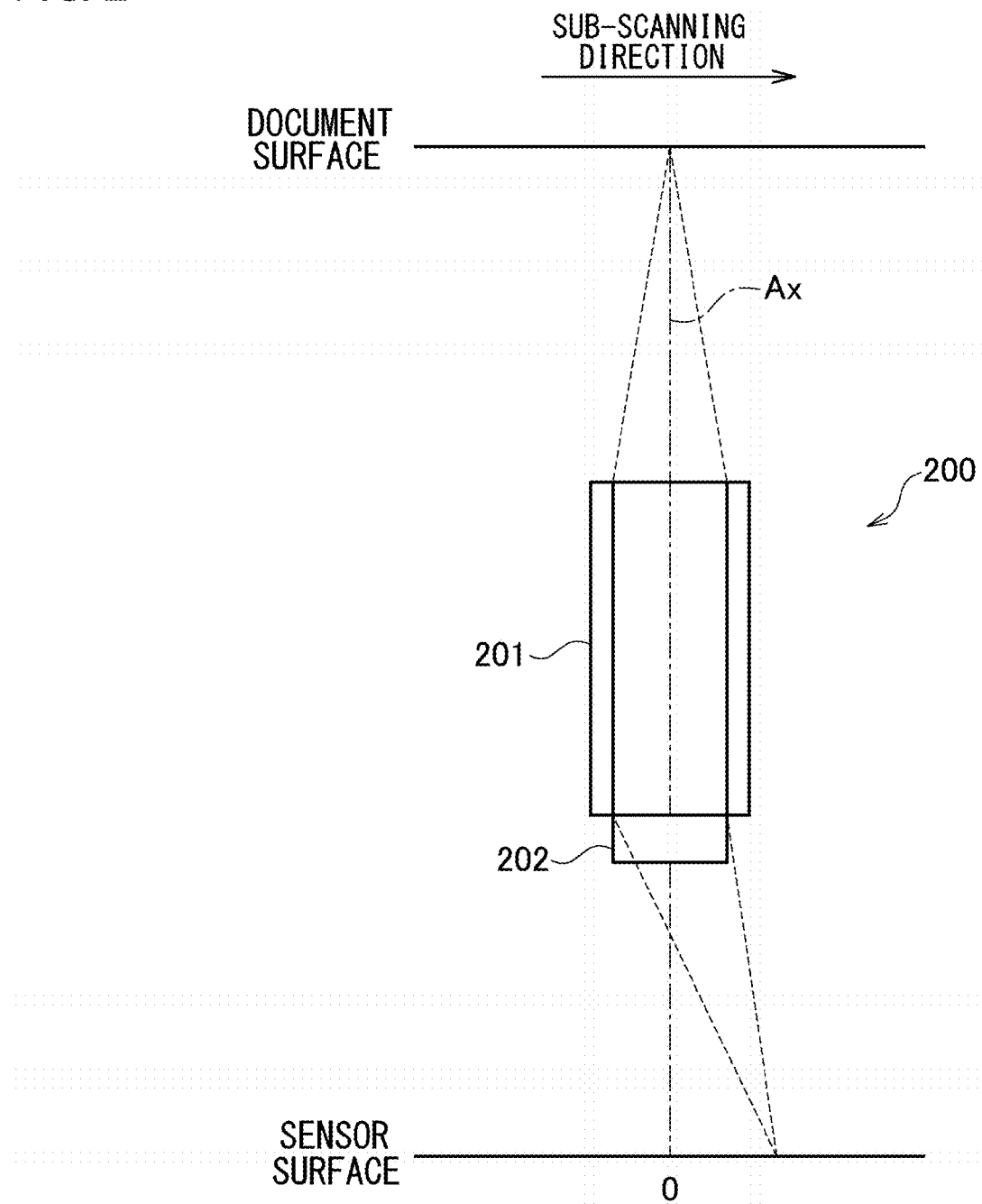
FIG. 2 is a schematic view of an erecting equal-magnification imaging system according to the first comparative example.
Figure 3:
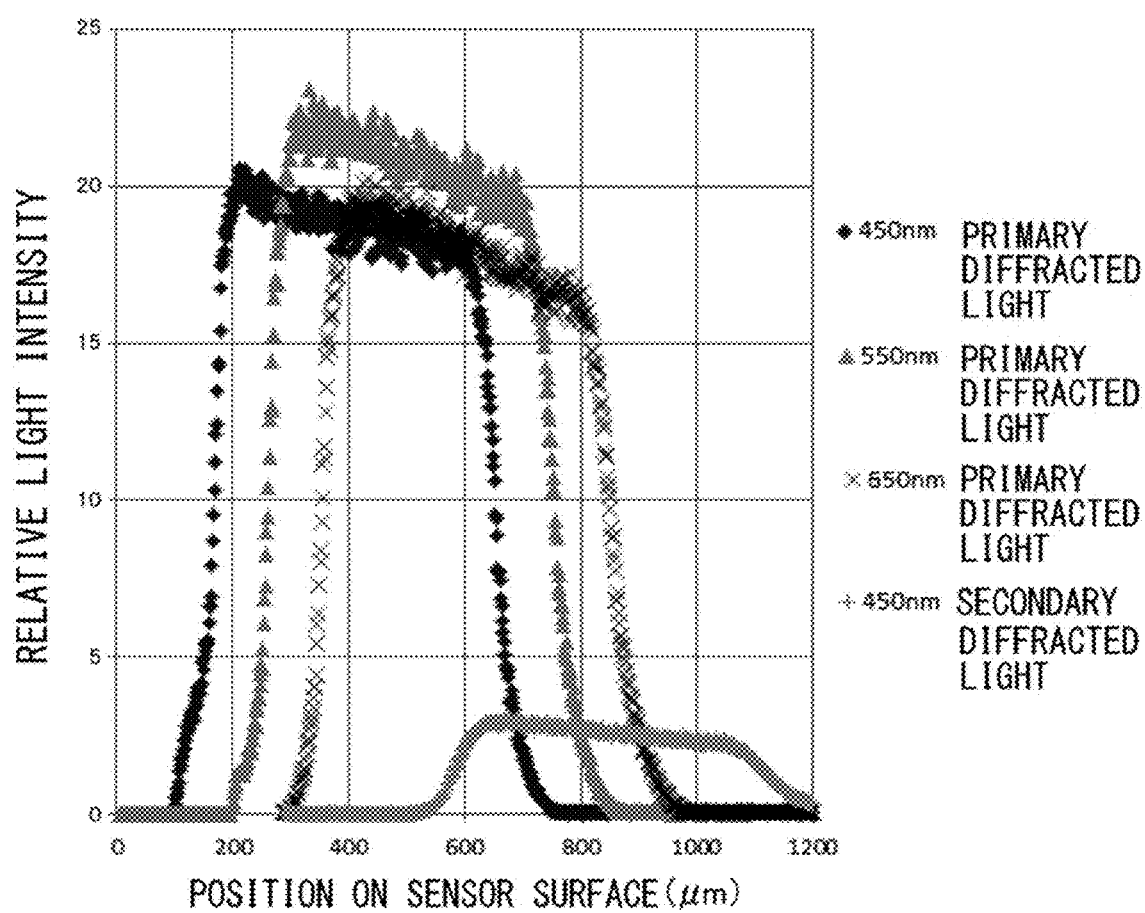
FIG. 3 shows a relative light intensity distribution on the sensor surface in the erecting equal-magnification imaging system according to the first comparative example.

FIG. 2 is a schematic view of an erecting equal-magnification imaging system 200 according to the first comparative example. FIG. 3 shows a relative light intensity distribution on the sensor surface in the erecting equal-magnification imaging system 200 according to the first comparative example. As shown in FIG. 2, the erecting equal-magnification imaging system 200 according to the first comparative example forms an erecting equal-magnification image of the document on the sensor surface by means of a single erecting equal-magnification lens array 201. A diffraction grating 202 is provided immediately after the erecting equal-magnification lens array 201.

Referring to FIG. 3, the horizontal axis represents the distance in the sub-scanning direction from a reference point (=0 mm) defined at the intersection between the optical axis Ax of the erecting equal-magnification imaging system 200 and the sensor surface that occurs when the diffraction grating 202 is not provided in FIG. 2, and the vertical axis represents the relative value of light intensity reaching the sensor surface.

A simulation was conducted in the following condition. An SLA (the lens length ($Z_0$)=4.3 mm, the optical distance between the document surface and the lens end face ($L_0$) =2.8 mm, and the total conjugate (TC)=9.9 mm) is used as an erecting equal-magnification lens array. The light source is defined as outputting lights with three wavelengths 650 nm, 550 nm, and 450 nm corresponding to the RGB colors, respectively. To provide a light ray contributing to the computation, light rays ($1 \times 10^8$ rays per each color) of an uniform intensity is emitted in 90° Lambertian emission from an area of φ1 mm around the intersection between the optical axis Ax of the erecting equal-magnification imaging system 200 and the document surface that occurs when the diffraction grating 202 is not provided in FIG. 2. A blazed transmission grating that maximizes the intensity of the primary diffracted light (the substrate thickness=0.5 mm, the central wavelength=550 nm, 340 lines/mm) is used as the diffraction grating 202. For simulation, Zemax Optic Studio, lens/illumination design software from Zemax, is used.

The light intensity distributions of the primary diffracted light with the wavelength 450 nm (B), the primary diffracted light with the wavelength 550 nm (G), and the primary diffracted light with the wavelength 650 nm (R) are mainly formed on the sensor surface. As shown in FIG. 3, the light intensities of lights having the wavelengths corresponding to the RGB colors overlap each other over an extensive area on the sensor surface, revealing that color separation is not properly performed in the first comparative example. This is because the problem of color mixture does not occur in the case the diffraction grating 202 is used to disperse the light in the sub-scanning direction provided that a point on the document surface is imaged on the sensor surface, but, in reality, there is a visual field.

Second Comparative Example

Figure 4:
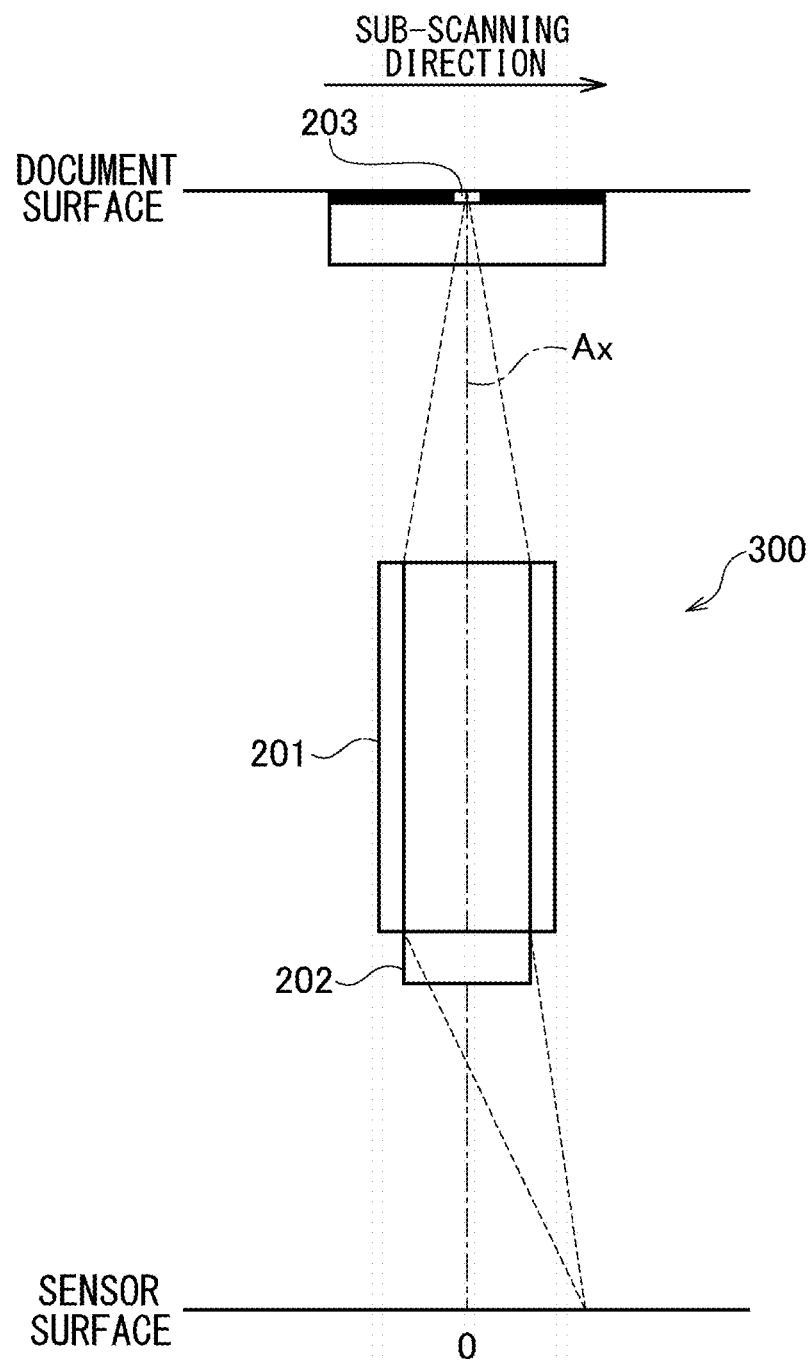
FIG. 4 is a schematic view of an erecting equal-magnification imaging system according to the second comparative example.
Figure 5:
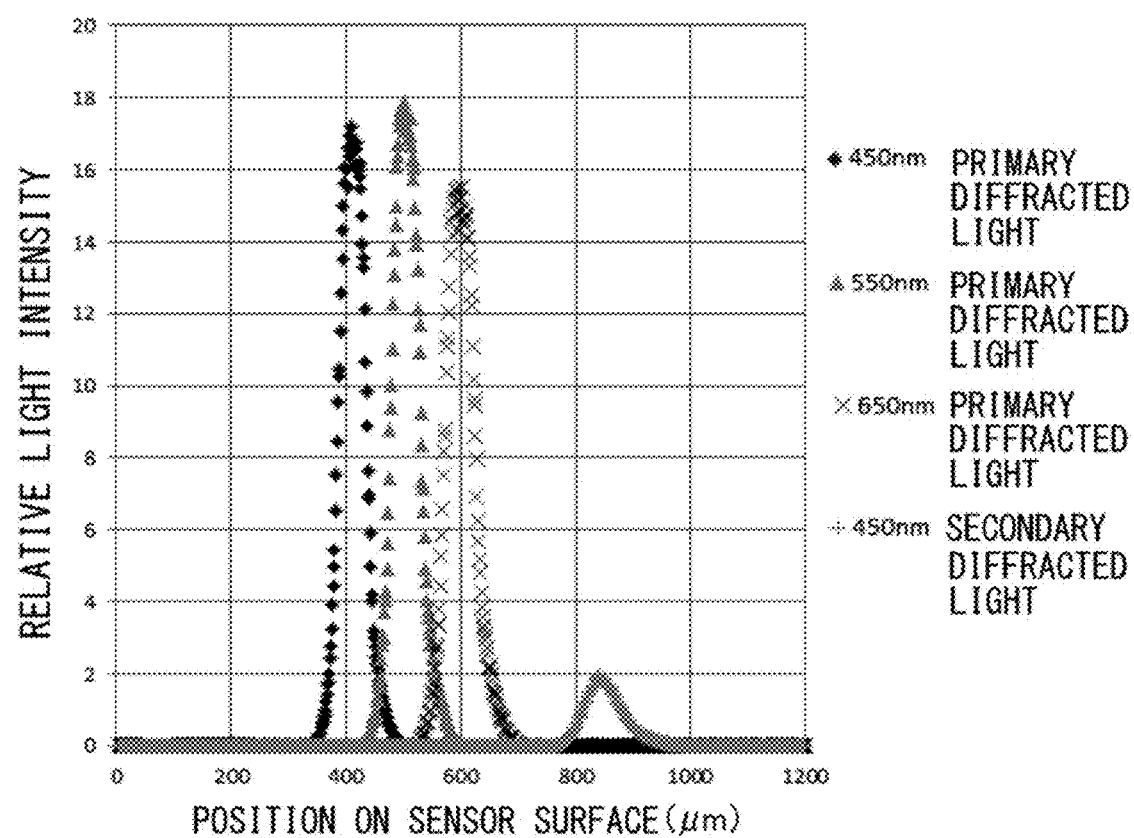
FIG. 5 shows a relative light intensity distribution on the sensor surface in the erecting equal-magnification imaging system according to the second comparative example.

FIG. 4 is a schematic view of an erecting equal-magnification imaging system 300 according to the second comparative example. FIG. 5 shows a relative light intensity distribution on the sensor surface in the erecting equal-magnification imaging system 300 according to the second comparative example. As shown in FIG. 4, the erecting equal-magnification imaging system 300 according to the second comparative example differs from the erecting equal-magnification imaging system 200 according to the first comparative example in that a slit 203 is provided on the document surface. The slit width (w)=50 μm, and the other simulation conditions are the same as those of the first comparative example.

As shown in FIG. 5, the erecting equal-magnification imaging system 300 according to the second comparative example produces intensity distributions of the lights with the wavelengths corresponding to the RGB colors that are separated and occur at different positions on the sensor surface, revealing that color separation is favorable. As mentioned above, however, the structure of the image sensor unit requires that the plate glass document table, etc. be located immediately beneath the document so that it is difficult to realize the second comparative example.

Third Comparative Example

Figure 6:
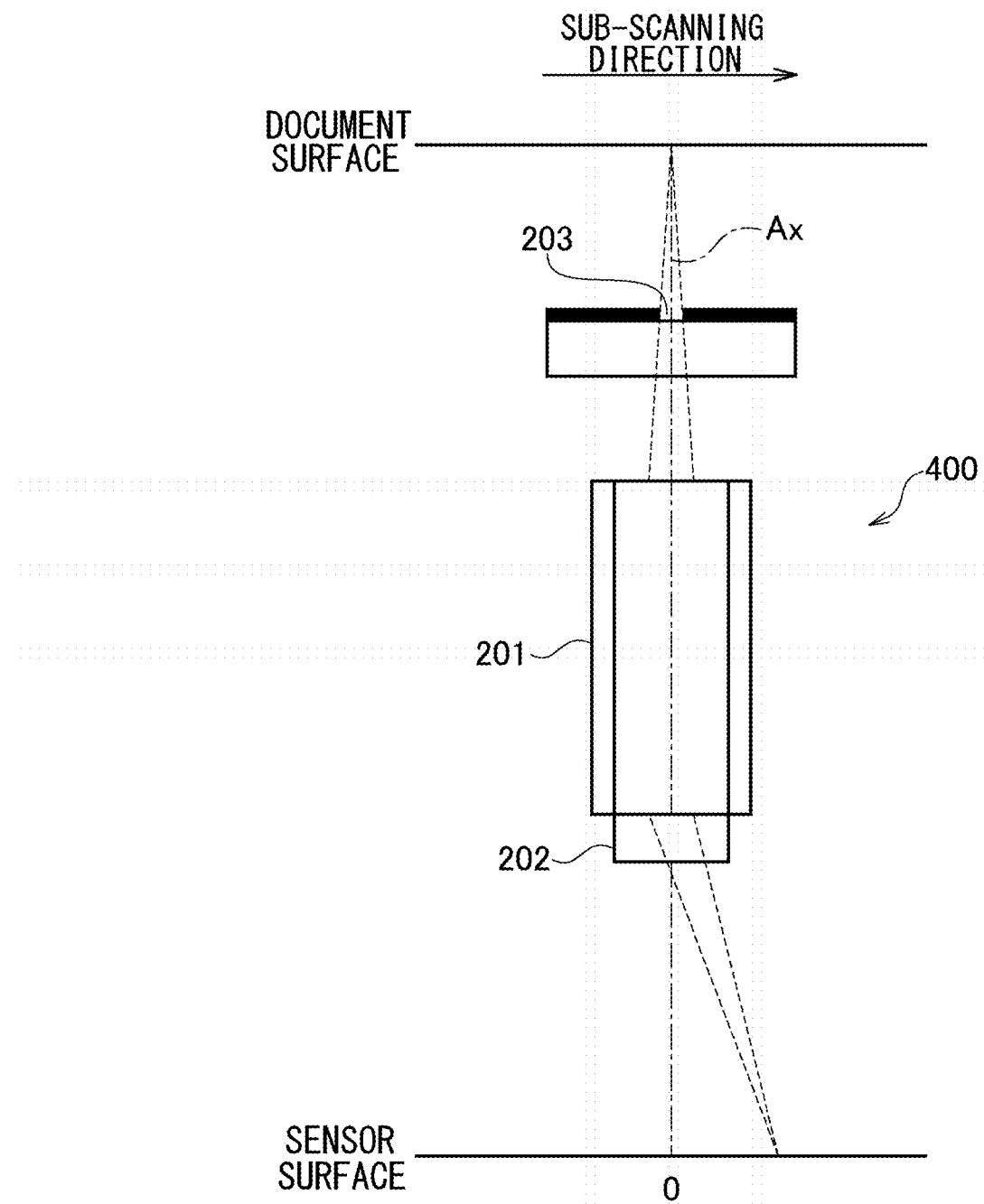
FIG. 6 is a schematic view of an erecting equal-magnification imaging system according to the third comparative example.
Figure 7:
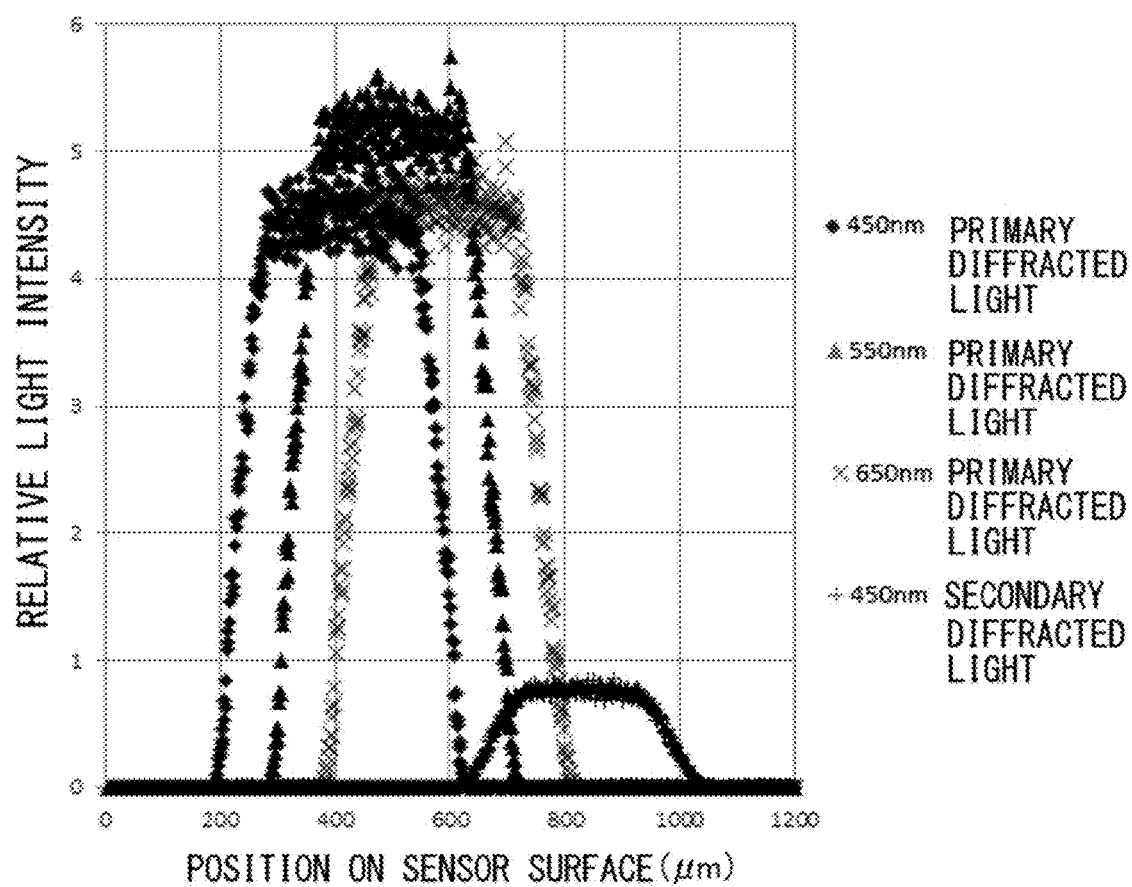
FIG. 7 shows a relative light intensity distribution on the sensor surface in the erecting equal-magnification imaging system according to the third comparative example.

FIG. 6 is a schematic view of an erecting equal-magnification imaging system 400 according to the third comparative example. FIG. 7 shows a relative light intensity distribution on the sensor surface in the erecting equal-magnification imaging system 400 according to the third comparative example. In the erecting equal-magnification imaging system 300 according to the second comparative example, the slit 203 is provided on the document surface. In the erecting equal-magnification imaging system 400 according to the third comparative example, the presence of the plate glass document table immediately beneath the document is allowed for, and the slit 203 is provided at a distance of 1.4 mm from the document surface toward the sensor surface. The other simulation conditions are the same as those of the second comparative example.

As shown in FIG. 7, color mixture occurs on the sensor surface in the erecting equal-magnification imaging system 400 according to the third comparative example. It is therefore clear that color separation is not favorable.

Fourth Comparative Example

Figure 8:
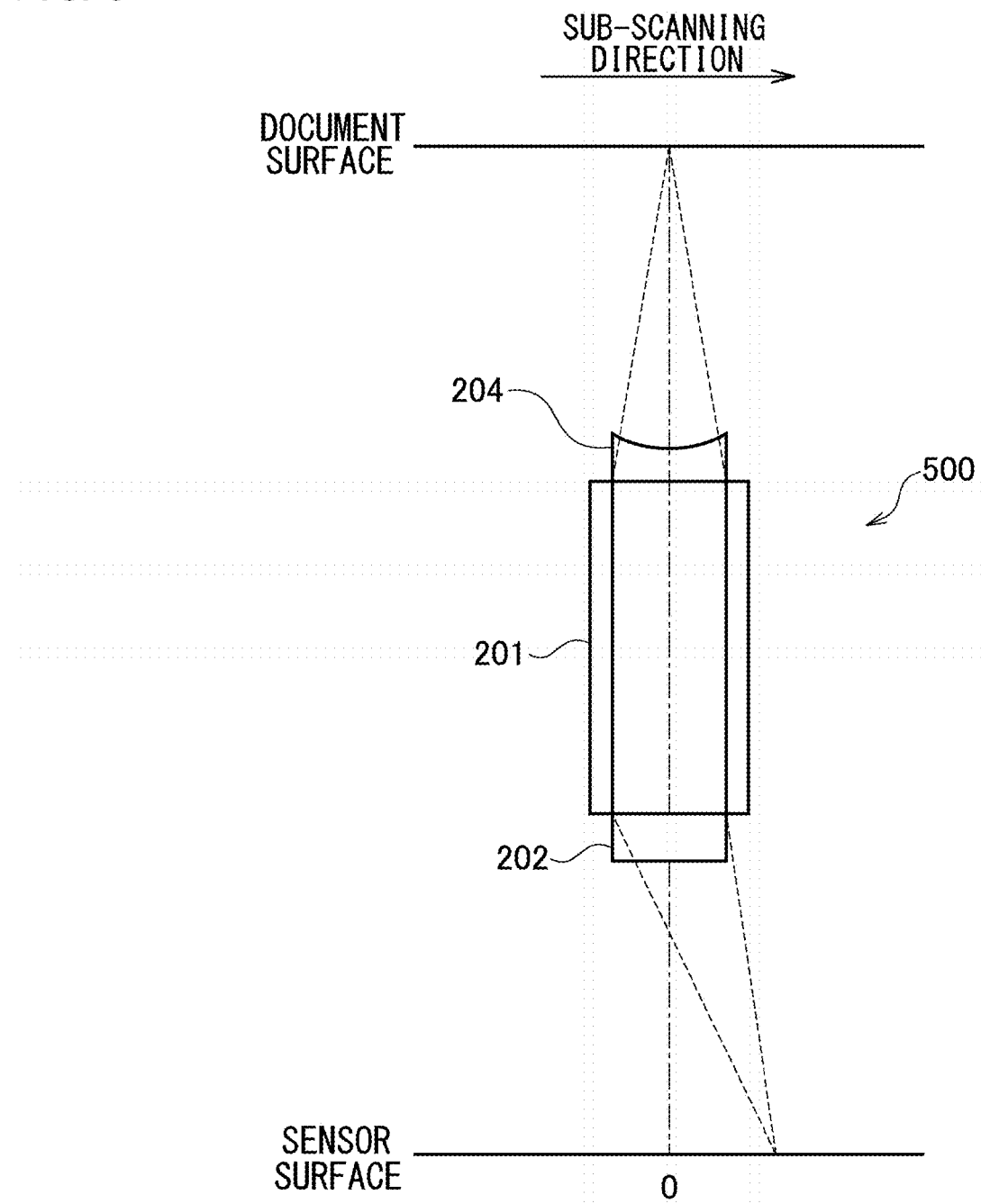
FIG. 8 is a schematic view of an erecting equal-magnification imaging system according to the fourth comparative example.
Figure 9:
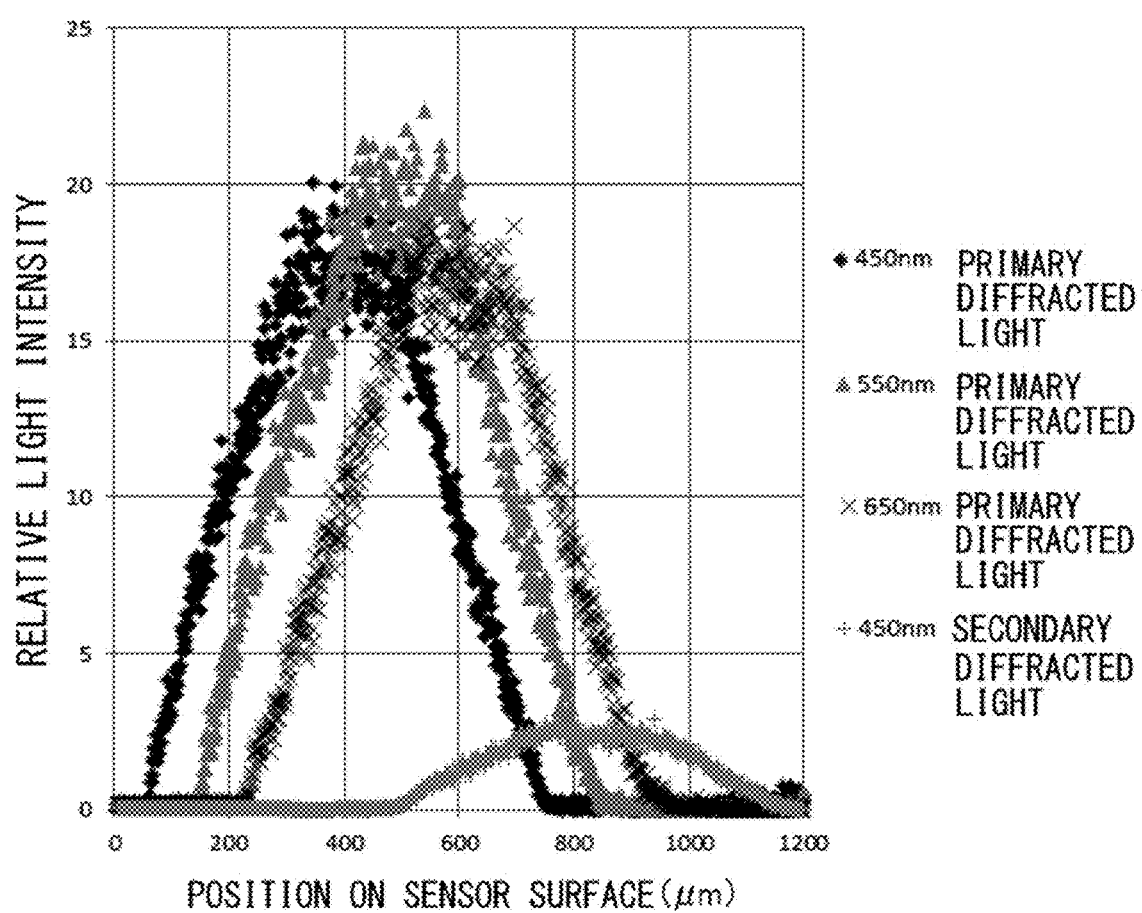
FIG. 9 shows a relative light intensity distribution on the sensor surface in the erecting equal-magnification imaging system according to the fourth comparative example.

FIG. 8 is a schematic view of an erecting equal-magnification imaging system 500 according to the fourth comparative example. FIG. 9 shows a relative light intensity distribution on the sensor surface in the erecting equal-magnification imaging system 500 according to the fourth comparative example. The erecting equal-magnification imaging system 500 according to the fourth comparative example differs from the erecting equal-magnification imaging system 200 according to the first comparative example in that a planoconcave cylindrical lens 204 is provided immediately before the erecting equal-magnification lens array 201 for the purpose of configuring the imaging magnification in the sub-scanning direction to be larger than the imaging magnification in the main scanning direction to prevent color mixture from occurring after the colors are separated. The simulation condition is such that the radius of curvature of the planoconcave cylindrical lens 204 in the sub-scanning direction (Rc)=−1.239 nm, and the horizontal magnification in the sub-scanning direction is three times the magnification in the main scanning direction.

However, as shown in FIG. 9, color mixture is produced on the sensor surface in the erecting equal-magnification imaging system 500 according to the fourth comparative example as well, revealing that color separation is not favorable.

Figure 10A:
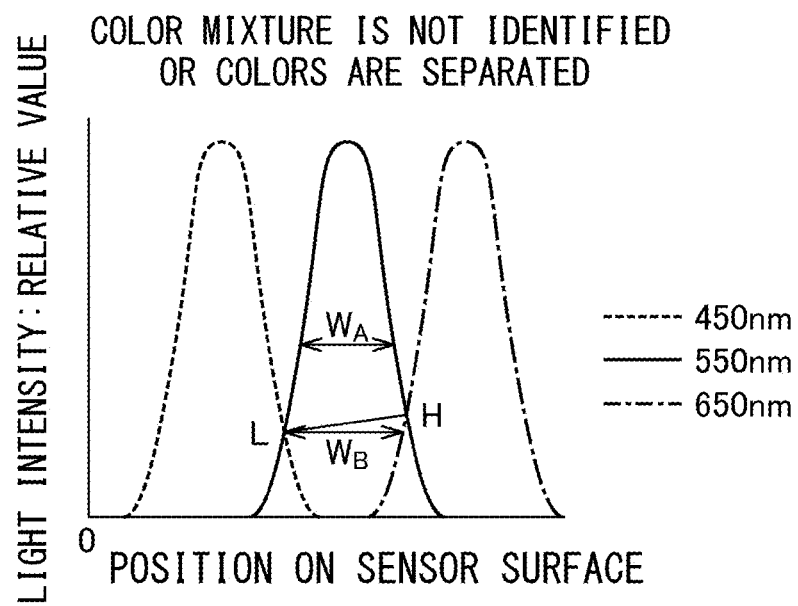
FIGS. 10A and 10B are figures for illustrating the definition of color mixture.
Figure 10B:
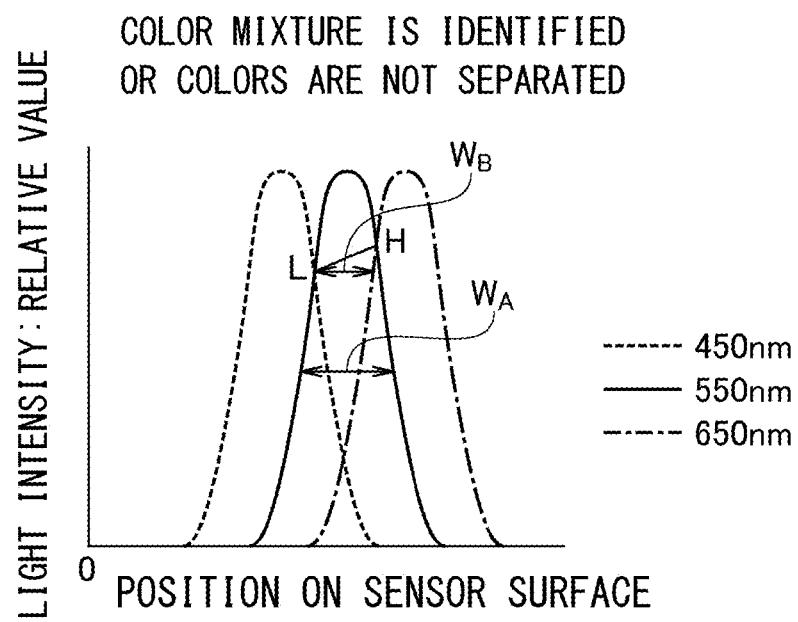

A description will now be given of the definition of color mixture in this specification. FIGS. 10A and 10B are figures for illustrating the definition of color mixture. Color mixture is defined as a state in which the light intensity distributions of the lights with the wavelengths corresponding to the RGB colors on the sensor surface overlap each other. In this specification, the degree of color mixture is defined for numerically determining a state in which "color mixture is not identified" or "colors are separated" and a state in which "color mixture is identified" or "colors are not separated".

FIG. 10A shows an exemplary light intensity distribution in a state in which "color mixture is not identified" or "colors are separated". FIG. 10B shows an exemplary light distribution in a state in which "color mixture is identified" or "colors are not separated". Given that the intersection between the optical axis of the erecting equal-magnification imaging system and the sensor surface that occurs when a spectral device such as a diffraction grating is not introduced is defined as point 0, and the light intensity distributions of the lights with the wavelengths 450 nm, 550 nm, and 650 nm on the surface are represented in relation to the distance from point 0, the half maximum of the light intensity distribution of the light with the wavelength 550 nm is denoted by a width $W_A$. Further, given that, of the intersections between the light intensity distribution of the light with the wavelength 550 nm and the light intensity distribution of the light with the wavelength 450 nm, the intersection with the highest light intensity is denoted by L, and, of the intersections between the light intensity of the light with the wavelength 550 nm and the light intensity of the light with the wavelength 650 nm, the intersection with the highest light intensity is denoted by H, the component of the line LH parallel to the horizontal axis is denoted by $W_B$. $W_B/W_A$ is defined as the degree of color mixture. The state in which $W_B/W_A>1$ is defined as a state in which "color mixture is not identified" or "colors are separated", and the state in which $W_B/W_A \leq 1$ is defined as a state in which "color mixture is identified", "colors are not separated", or "color separation is insufficient".

Figure 11:
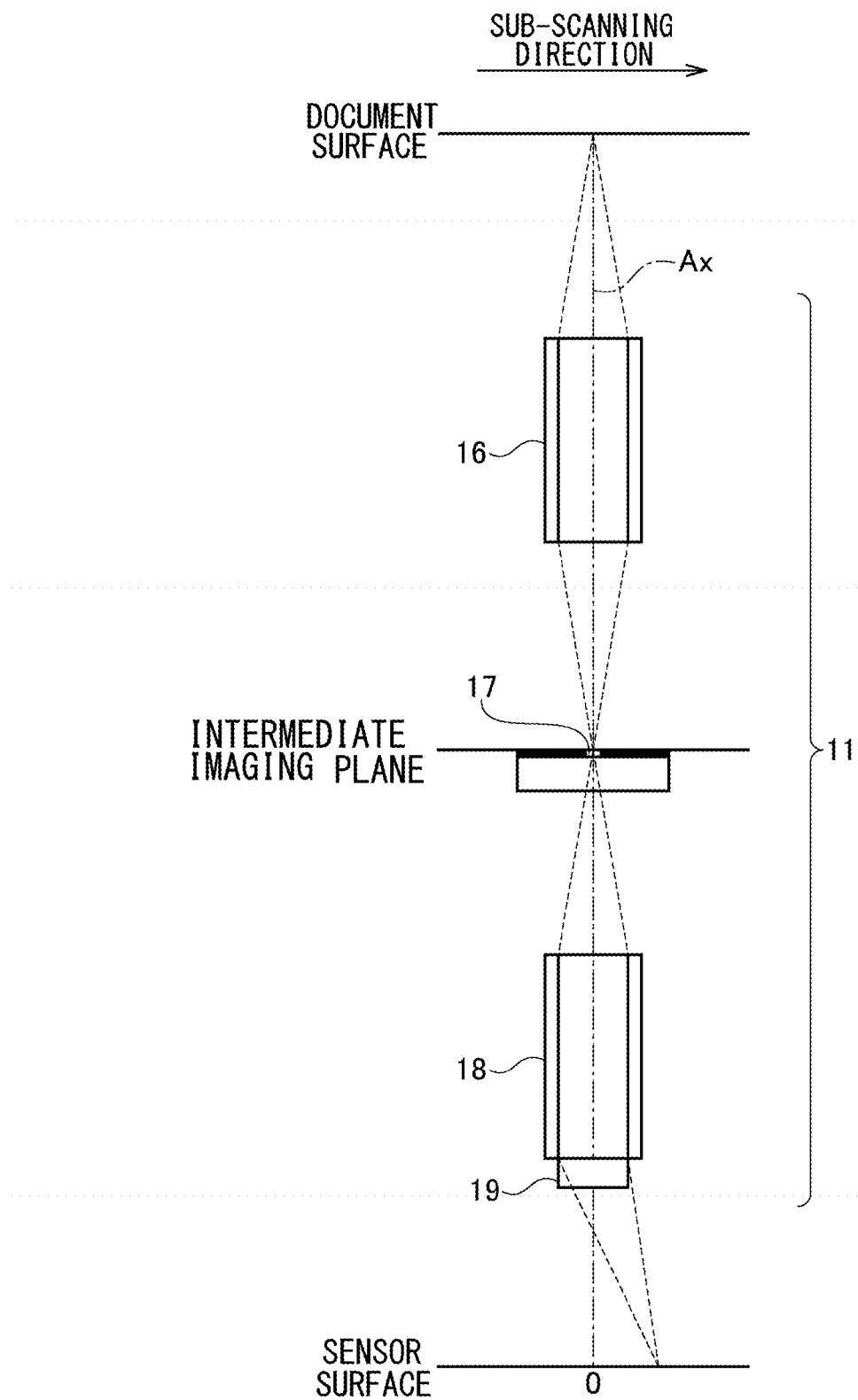
FIG. 11 is a schematic view of the erecting equal-magnification imaging system in the image sensor unit according to the embodiment of the present invention described with reference to FIG. 1.

FIG. 11 is a schematic view of the erecting equal-magnification imaging system in the image sensor unit 10 according to the embodiment of the present invention described with reference to FIG. 1. As described with reference to FIG. 1, the erecting equal-magnification imaging system 11 according to the embodiment is configured such that the slit 17 is provided on the intermediate imaging plane between the first erecting equal-magnification lens array 16 and the second erecting equal-magnification lens array 18, and the diffraction grating 19 is provided immediately beneath the second erecting equal-magnification lens array 18.

Figure 12:
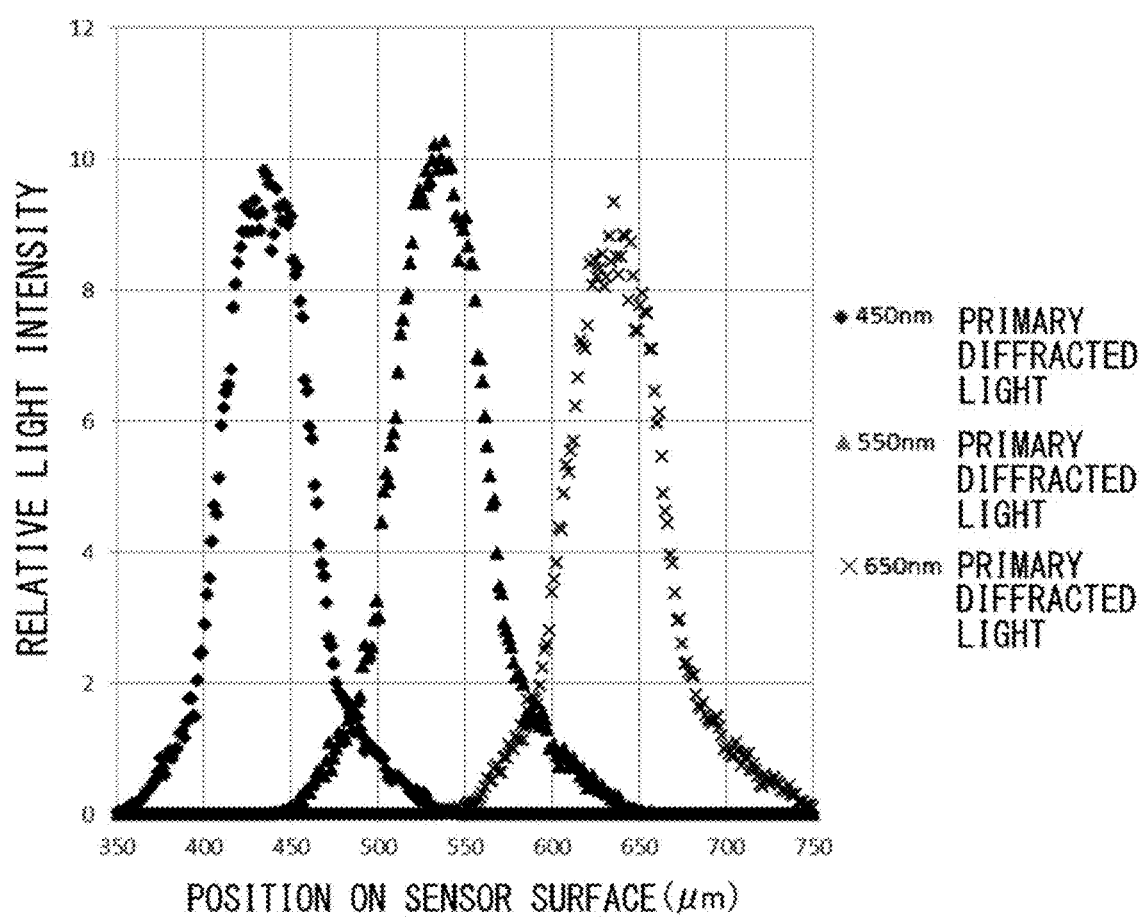
FIG. 12 shows a relative light intensity distribution on the sensor surface that occurs when the slit width w is 50 μm in the erecting equal-magnification imaging system shown in FIG. 11.
Figure 13:
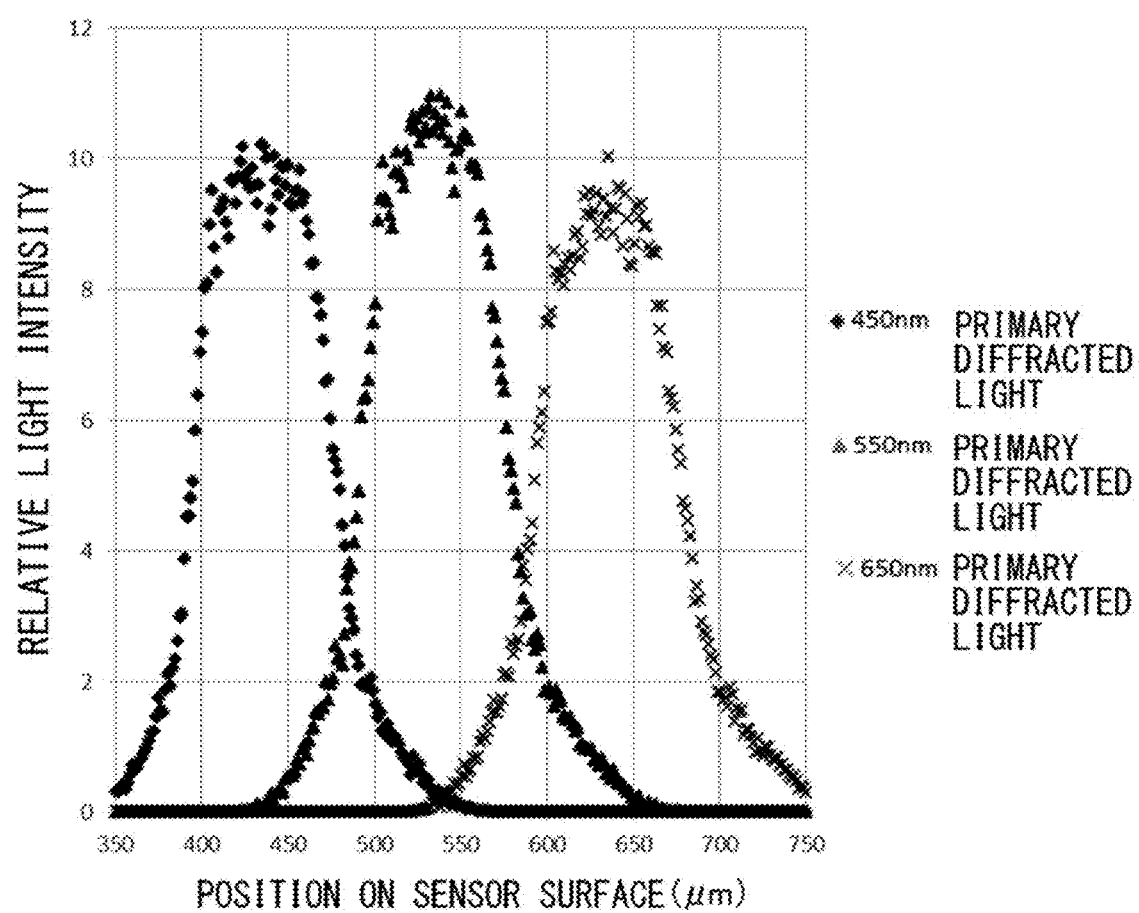
FIG. 13 shows a relative light intensity distribution on the sensor surface that occurs when the slit width w is 75 μm in the erecting equal-magnification imaging system shown in FIG. 11.
Figure 14:
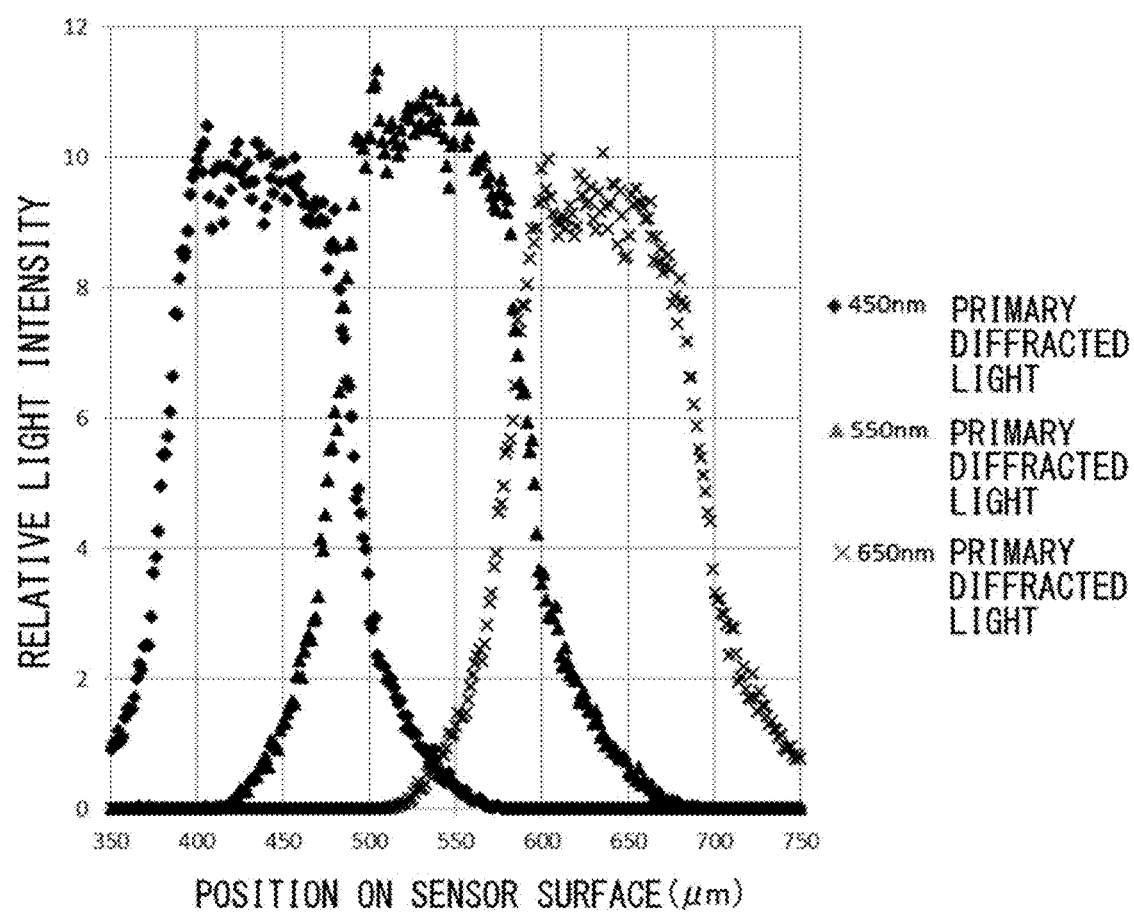
FIG. 14 shows a relative light intensity distribution on the sensor surface that occurs when the slit width w is 100 μm in the erecting equal-magnification imaging system shown in FIG. 11.
Figures 15, 16:
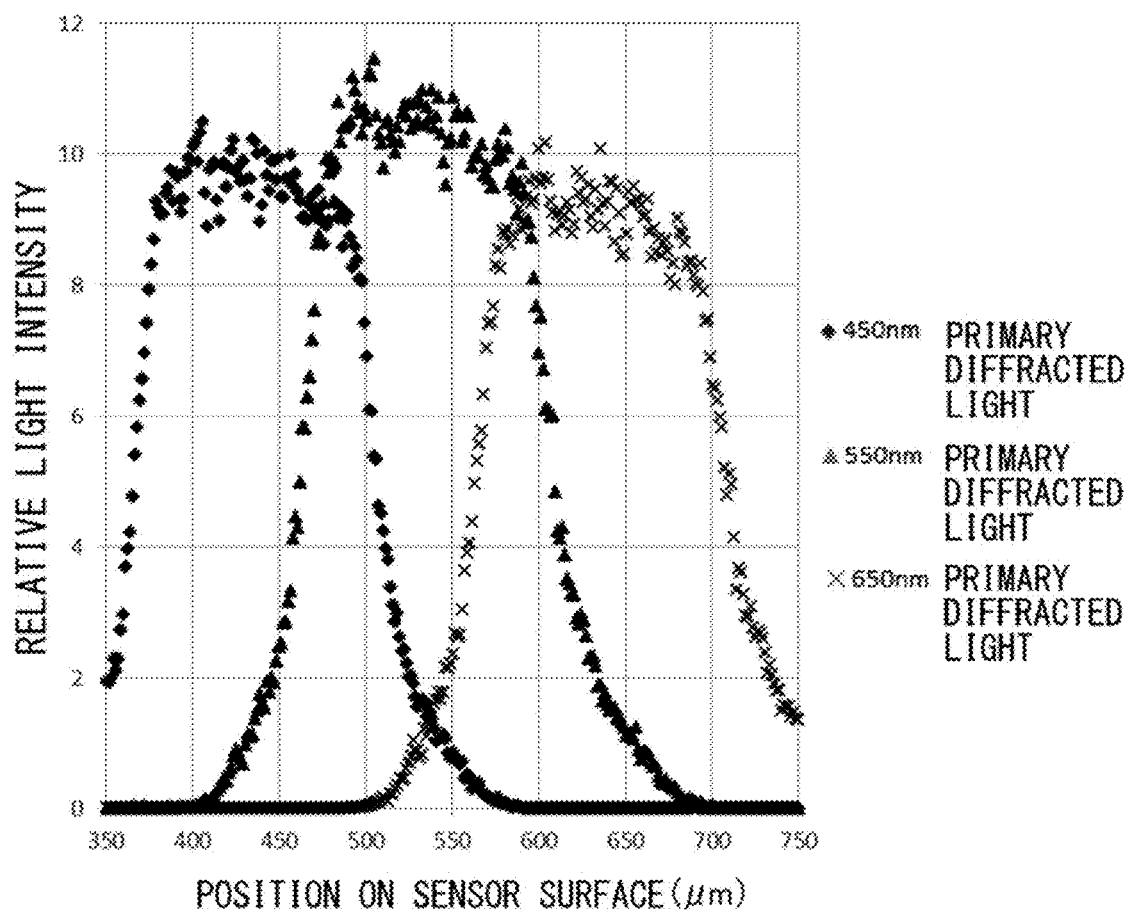
FIG. 15 shows a relative light intensity distribution on the sensor surface that occurs when the slit width w is 125 μm in the erecting equal-magnification imaging system shown in FIG. 11.
FIG. 16 shows the degree of color mixture in the simulation result shown in FIGS. 12, 13, 14 and 15.

FIGS. 12-15 show relative light intensity distributions on the sensor surface in the image sensor unit 10 according to the embodiment of the present invention. FIGS. 12-15 show simulation results yielded when the slit width w is changed. FIG. 12 shows a light intensity distribution that occurs when the slit width w is 50 μm. FIG. 13 shows a light intensity distribution that occurs when the slit width w is 75 μm. FIG. 14 shows a light intensity distribution that occurs when the slit width w is 100 μm. FIG. 15 shows a light intensity distribution that occurs when the slit width w is 125 μm. The first erecting equal-magnification lens array 16 on the document side and the second erecting equal-magnification lens array 18 on the sensor surface side are arranged such that the optical distance L0 between the document surface and the document side end face of the first erecting equal-magnification lens array 16 is 2.8 mm, the optical distance L2 between the sensor surface side end face of the first erecting equal-magnification lens array 16 and the document side end face of the second erecting equal-magnification lens array 18 is 5.6 mm, and the optical distance L3 between the sensor surface side end face of the second erecting equal-magnification lens array 18 and the sensor surface is 2.8 mm. The other simulation conditions are the same as those in the first comparative example described above.

FIG. 16 shows the degree of color mixture $W_B/W_A$ in the simulation result of the embodiment of the present invention shown in FIGS. 12-15. FIG. 16 shows that, when the slit width w is 75 μm or smaller, the degree of color mixture $W_B/W_A$ is larger than 1, and color mixture is prevented, and, when the slit width w is 50 μm or smaller, color mixture is prevented more properly.

Figure 17:
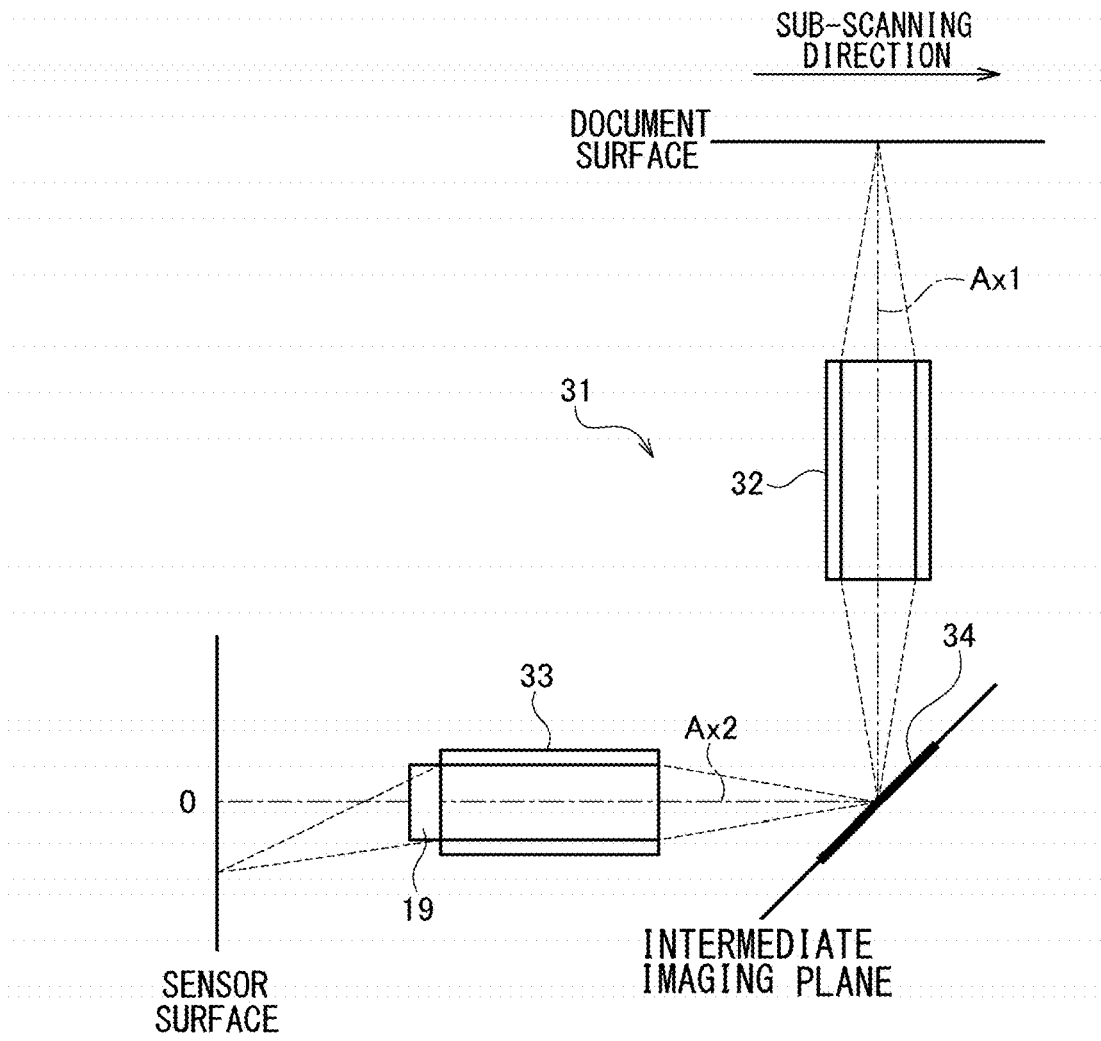
FIG. 17 is a schematic view of an erecting equal-magnification imaging system in an image sensor unit according to another embodiment of the present invention.

FIG. 17 is a schematic view of an erecting equal-magnification imaging system 31 according to another embodiment of the present invention. In this embodiment, too, the erecting equal-magnification imaging system 31 is provided with two erecting equal-magnification lens arrays (the first erecting equal-magnification lens array 32 on the document surface side and the second erecting equal-magnification lens array 33 on the sensor surface side). In this embodiment, however, a mirror 34 extending in the main scanning direction and having a predetermined width (v) in the sub-scanning direction is provided in place of the slit on the intermediate imaging plane between the first erecting equal-magnification lens array 32 and the second erecting equal-magnification lens array 33. In this embodiment, the mirror 34 functions as a visual field restriction device that restricts the visual field in the sub-scanning direction. The width v of the mirror 34 may be, for example, 50 μm. Further, the first erecting equal-magnification lens array 32 and the second erecting equal-magnification lens array 33 are arranged such that the angle formed by the optical axis Ax1 of the first erecting equal-magnification lens array 32 and the optical axis Ax2 of the second erecting equal-magnification lens array 33 is a predetermined angle (e.g., 90°).

Figure 18:
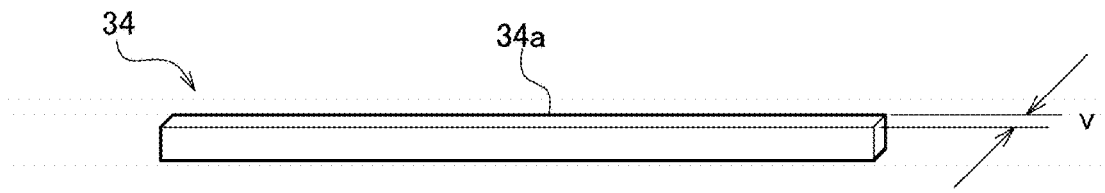
FIG. 18 shows an example of the mirror.

FIG. 18 shows an example of the mirror 34. As shown in FIG. 18, the mirror 34 may include a mirror surface 34a of a rectangular strip shape elongated in the main scanning direction and having a width v in the sub-scanning direction.

Figure 19:
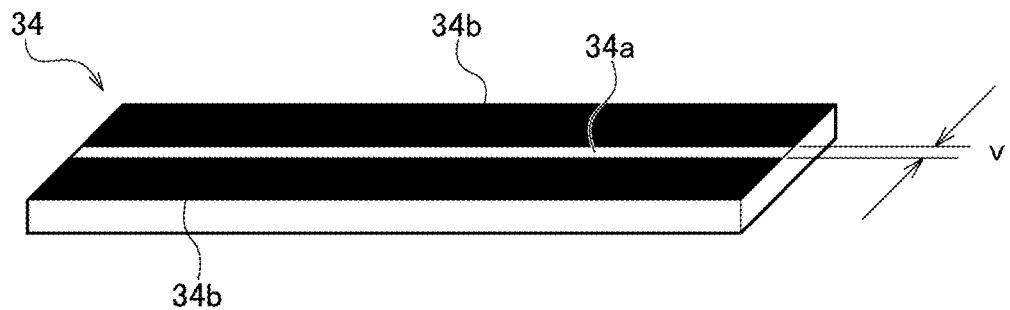
FIG. 19 shows another example of the mirror.

FIG. 19 shows another example of the mirror 34. As shown in FIG. 19, the mirror 34 may be configured such that, of the mirror surface having a certain effective area, the portion other than an area having a predetermined width v and elongated in the main scanning direction is shielded by a light shielding film 34b so as to form the mirror surface 34a of a rectangular strip shape. In this case, the dimension of the mirror 34 is increased, which is advantageous in terms of implementation.

Figure 20:
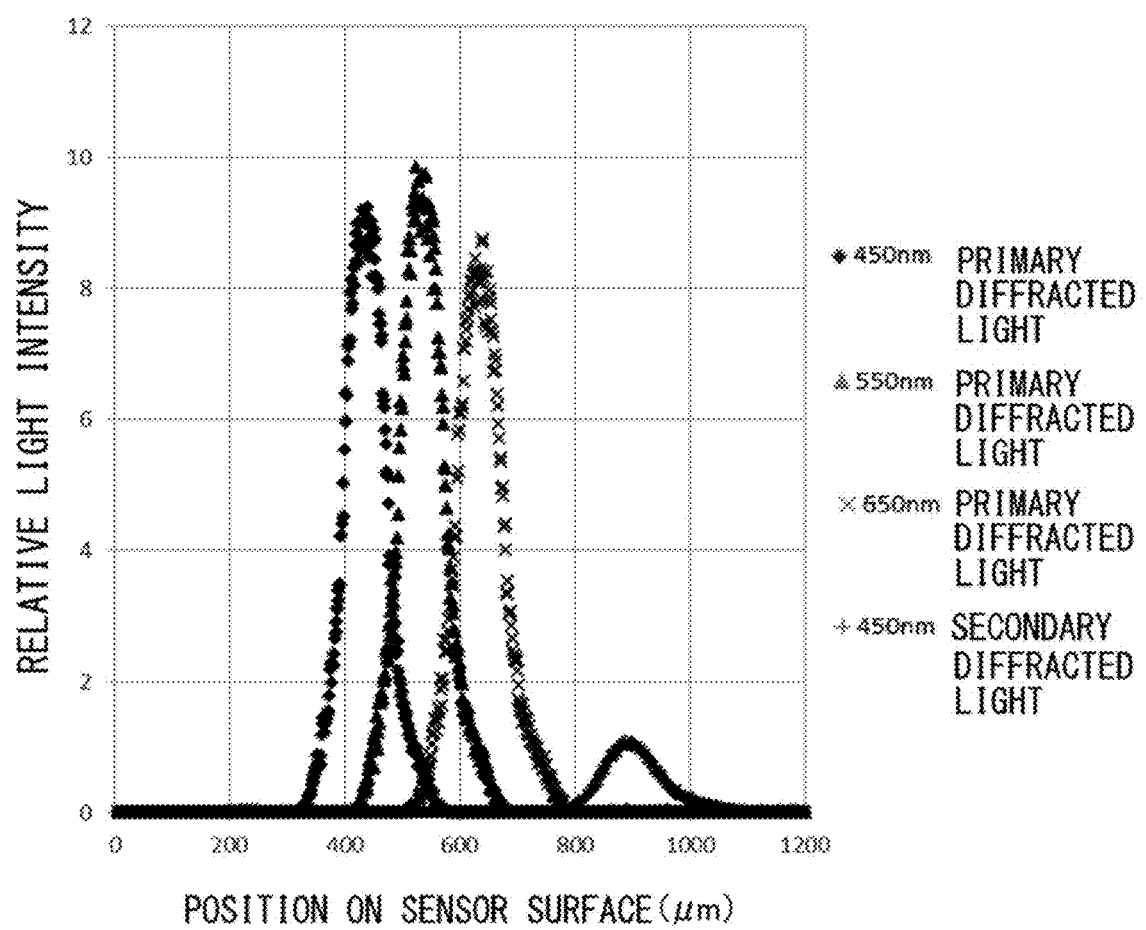
FIG. 20 shows a relative light intensity distribution on the sensor surface in the erecting equal-magnification imaging system shown in FIG. 17.

FIG. 20 shows a relative light intensity distribution on the sensor surface in the erecting equal-magnification imaging system 31 shown in FIG. 17. As shown in FIG. 20, color separation is favorable in the case the mirror 34 of a rectangular strip shape is provided on the intermediate imaging plane.

In the case the mirror 34 is used in place of the slit as in this embodiment, the light ray from the document surface can be bent at a predetermined angle (e.g., 90°), which is advantageous for the purpose of saving the space in the image sensor unit.

Figure 21:
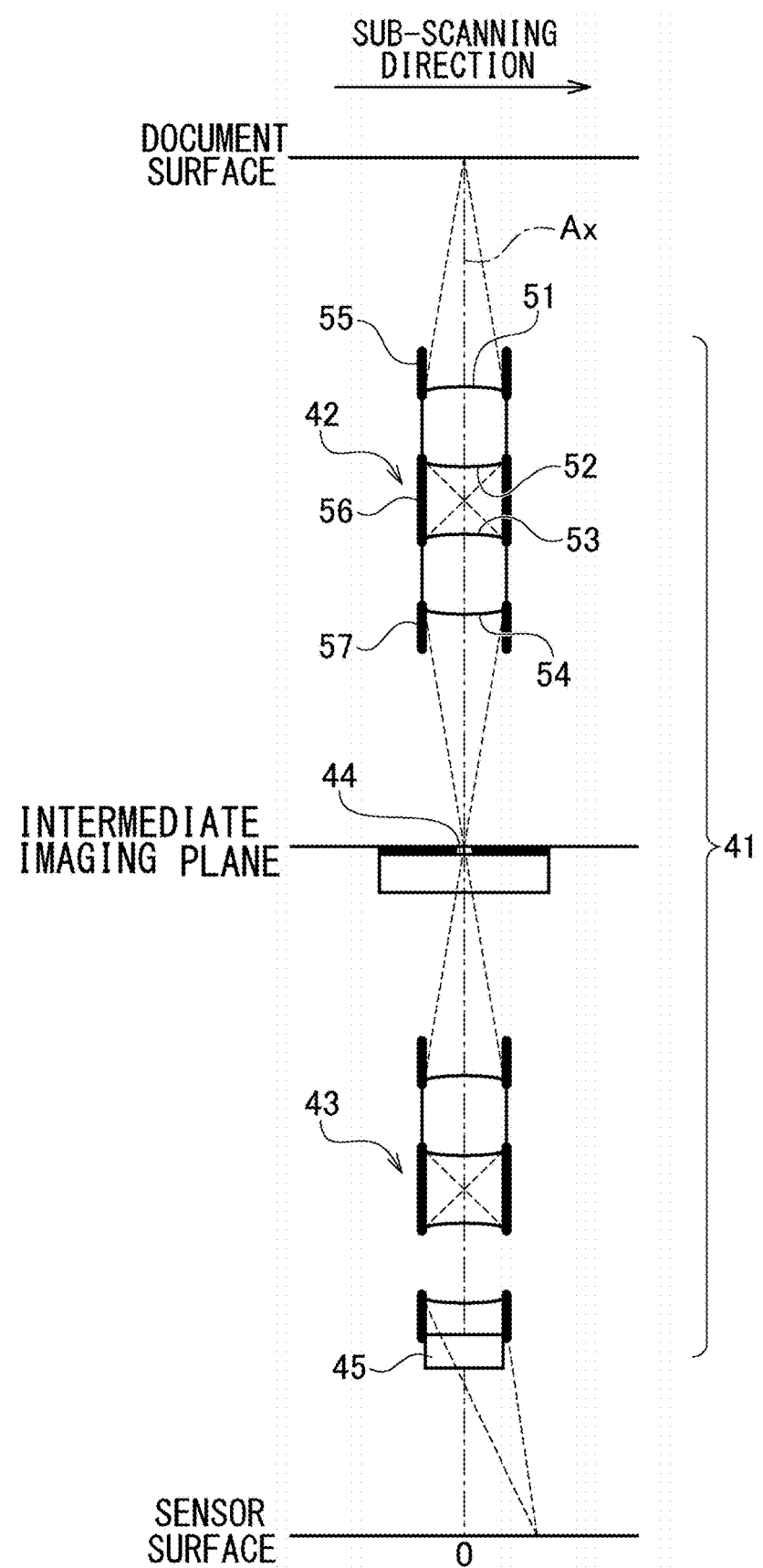
FIG. 21 is a schematic view of an erecting equal-magnification imaging system in an image sensor unit according to still another embodiment of the present invention.

FIG. 21 is a schematic view of an erecting equal-magnification imaging system 41 in an image sensor unit according to still another embodiment of the present invention. In this embodiment, the erecting equal-magnification imaging system 41 is provided with two erecting equal-magnification lens array plates arranged in series such that the optical axes are aligned (a first erecting equal-magnification lens array plate 42 on the document surface side and a second erecting equal-magnification lens array plate 43 on the sensor surface side).

The first erecting equal-magnification lens array plate 42 and the second erecting equal-magnification lens array plate 43 have same optical performance. The erecting equal-magnification lens array plate is configured such that two lens array plates each including a large number of convex lenses arranged in the main scanning direction on both surfaces of a transparent dielectric (e.g., plastic) substrate are layered such that the optical axes of the individual convex lenses are aligned. The erecting equal-magnification lens array plate includes a first surface lens 51, a second surface lens 52, a third surface lens 53, and a fourth surface lens 54 in the stated order away from the document. Further, a first surface light shielding wall 55 is provided around the first surface lens 51, a second-third surface light shielding wall 56 is provided around the second surface lens 52 and the third surface lens 53, and a fourth surface light shielding wall 57 is provided around the fourth surface lens 54 for the purpose of shielding stray light. FIG. 22 shows a specification of the dimension of the erecting equal-magnification lens array plate used in the simulation. The shape of the first surface lens 51-the fourth surface lens 54 is based on the following expression (unit: mm). It should be noted that the reference symbols R, AD, AE, AF, and AG are inverted in the second surface lens 52 and in the fourth surface lens 54.

$$z = \frac{\frac{1}{R} \times r^2}{1 + \sqrt{1-\left(\frac{r}{R}\right)^2}} + AD \times r^4 + AE \times r^6 + AF \times r^8 + AG \times r^{10}$$

Like the erecting equal-magnification imaging system 11 using an SLA described with reference to FIGS. 1 and 11, the erecting equal-magnification imaging system 41 according to this embodiment is also configured such that a slit 44 is provided on the intermediate imaging plane between the first erecting equal-magnification lens array plate 42 and the second erecting equal-magnification lens array plate 43. Further, a diffraction grating 45 is provided immediately after the second erecting equal-magnification lens array plate 43.

Figure 23:
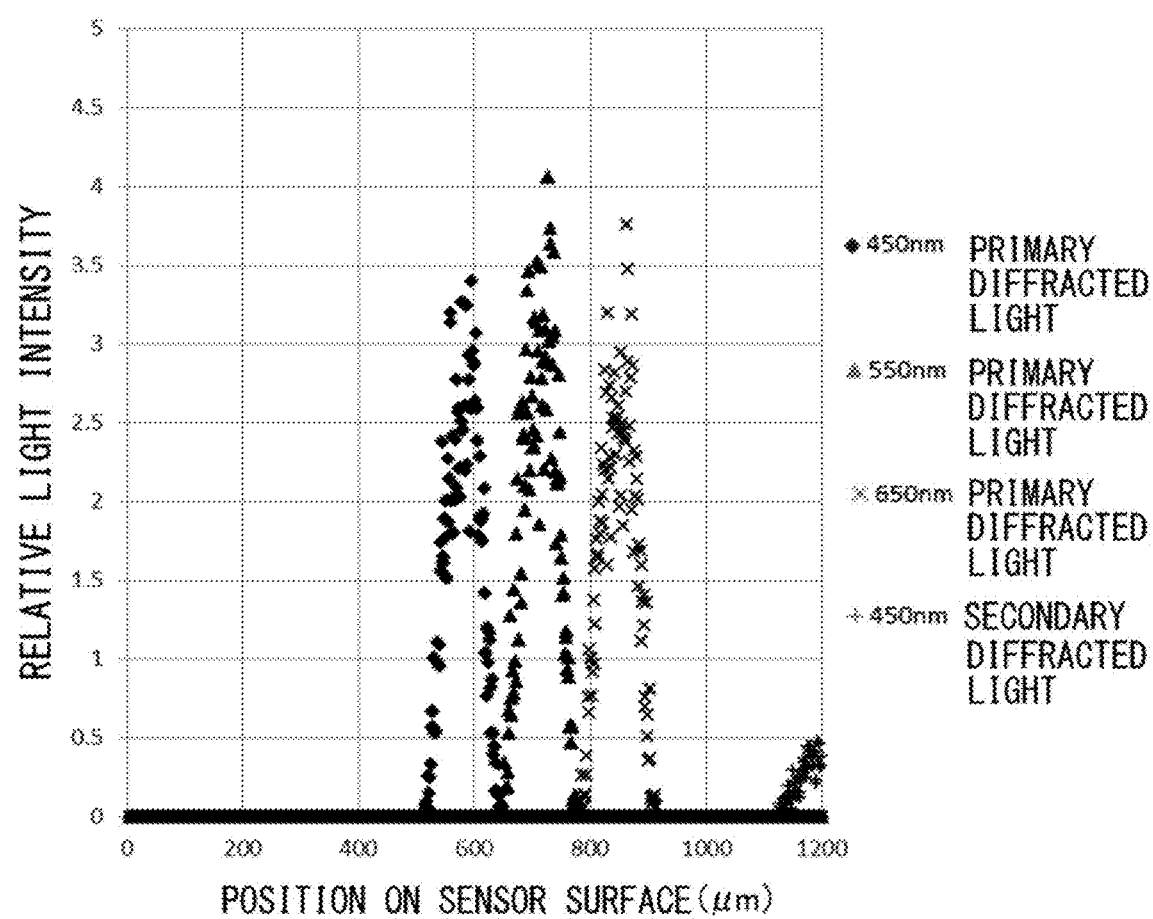
FIG. 23 shows a relative light intensity distribution on the sensor surface in the erecting equal-magnification imaging system shown in FIG. 21.

FIG. 23 shows a relative light intensity distribution on the sensor surface in the erecting equal-magnification imaging system 41 shown in FIG. 21. As shown in FIG. 23, color separation is favorable when the erecting equal-magnification lens array plate is used in place of the SLA.

In the embodiments described above, a simulation was conducted assuming that the linear light source outputs lights with the three wavelengths 650 nm, 550 nm, and 450 nm corresponding to the RGB colors. Alternatively, a larger number of wavelengths may be used. For example, lights with 410 nm (ultraviolet), 850 nm (near infrared), may be used.

Figure 24:
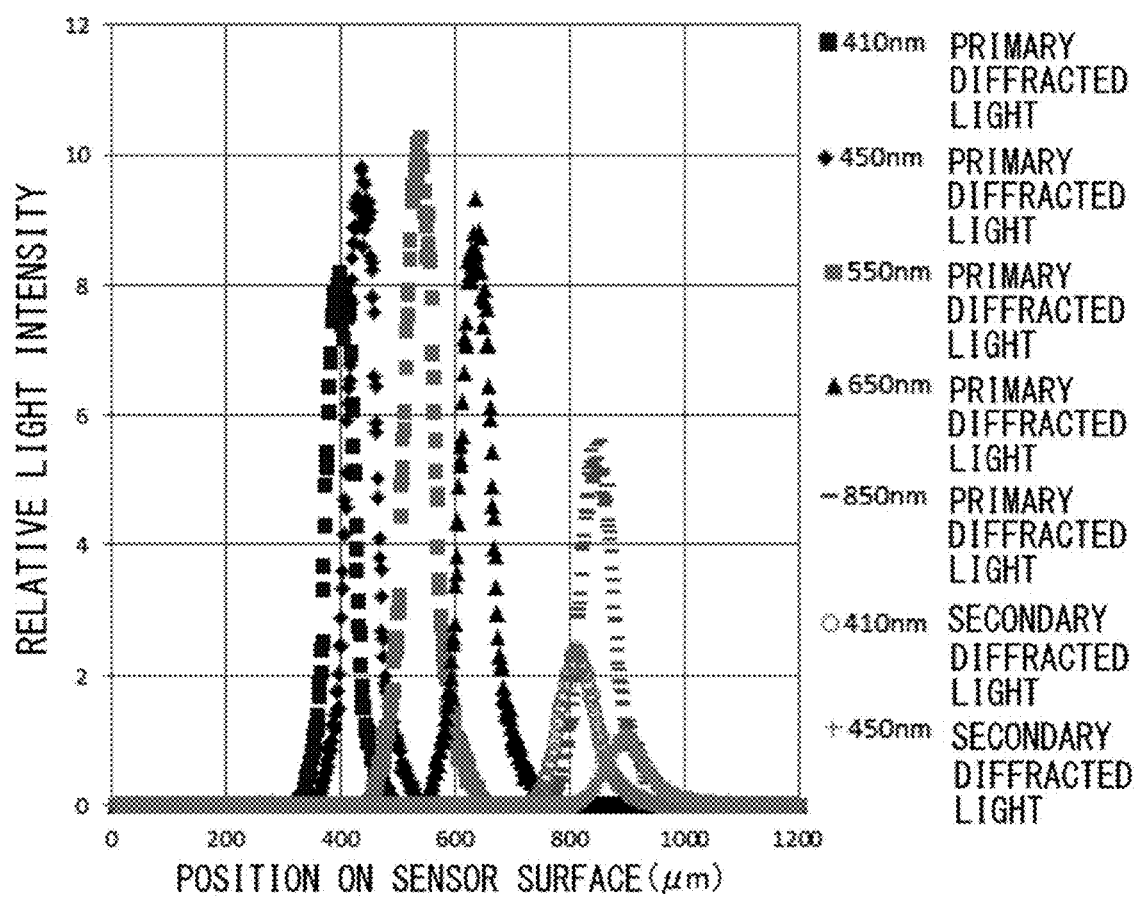
FIG. 24 shows a relative light intensity distribution on the sensor surface that occurs when a linear light source outputting lights with five wavelengths 410 nm, 450 nm, 550 nm, 650 nm, and 850 nm is used in the erecting equal-magnification imaging system shown in FIG. 11.

FIG. 24 shows a relative light intensity distribution on the sensor surface that occur when a linear light source outputting lights with five wavelengths 410 nm, 450 nm, 550 nm, 650 nm, and 850 nm is used in the erecting equal-magnification imaging system 11 shown in FIG. 11. The simulation result shows that color separation is not successful between the primary diffracted lights with 410 nm and 450 nm, and between the primary diffracted light with 850 nm and the secondary diffracted lights with 410 nm and 450 nm. In this case, color separation is improved by changing the timing of output from the linear light source from one wavelength to another.

Figure 25A:
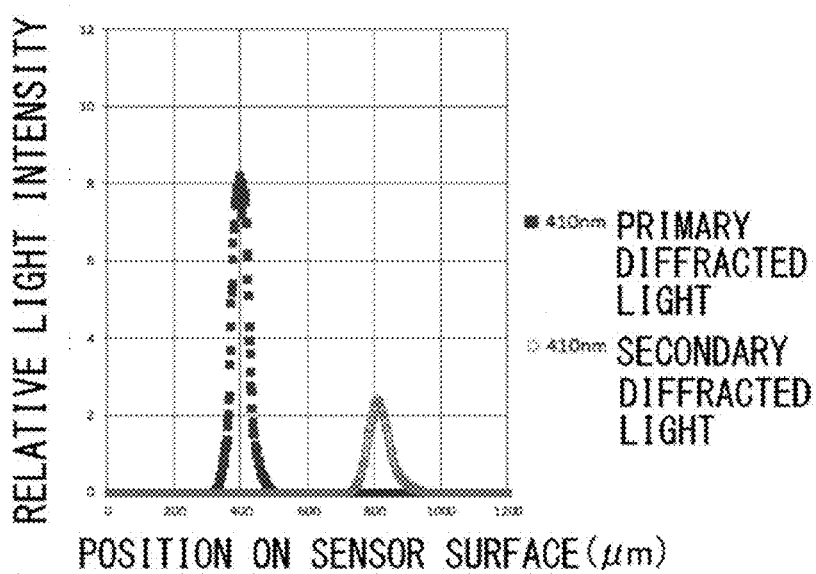
FIGS. 25A, 25B and 25C show relative light intensity distributions on the sensor surface that occur when the linear light source outputs lights at three different points of time.
Figure 25B:
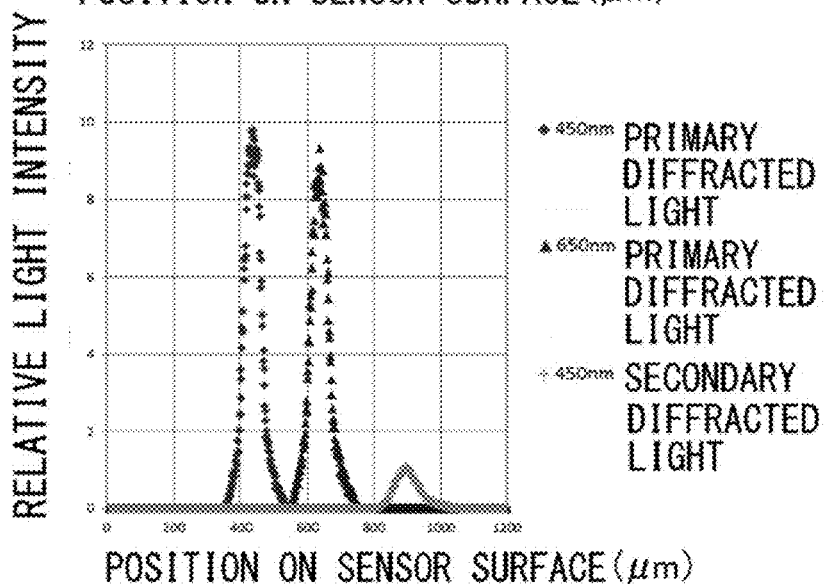
Figure 25C:
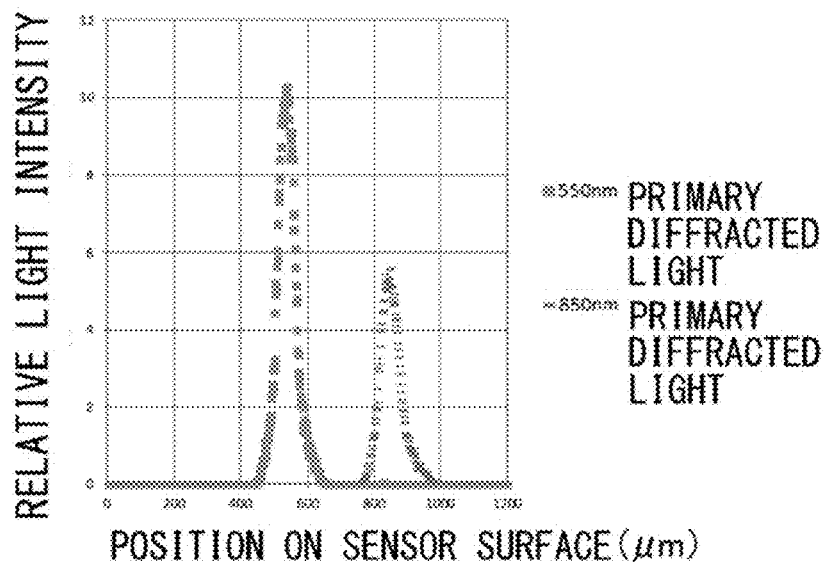

FIGS. 25A-25C show relative light intensity distributions on the sensor surface that occur when the linear light source outputs lights at three different points of time. FIG. 25A shows a relative light intensity distribution, on the sensor surface, of the light with the wavelength 410 nm output at a first point of time. FIG. 25B shows a relative light intensity distribution, on the sensor surface, of the lights with the wavelengths 450 nm and 650 nm output at a second point of time. FIG. 25C shows a relative light intensity distribution, on the sensor surface, of the lights with the wavelengths 550 nm and 850 nm output at a third point of time. FIGS. 25A-25C reveal that color separation is improved by causing the linear light source to output lights at different points of time.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. An image sensor unit comprising:
   a linear light source that illuminates a document with a light;
   a first erecting equal-magnification lens array and a second erecting equal-magnification lens array arranged in the stated order away from the document so as to receive a light reflected from the document and form an erecting equal-magnification image;
   a visual field restriction device provided on an intermediate imaging plane between the first erecting equal-magnification lens array and the second erecting equal-magnification lens array;
   a spectral device that disperses a light output from the second erecting equal-magnification lens array; and
   a linear image sensor that receives a light dispersed by the spectral device.

2. The image sensor unit according to claim 1, wherein given that a direction of arrangement of single lenses forming the erecting equal-magnification lens arrays is defined as a main scanning direction and a direction perpendicular to the main scanning direction is defined as a sub-scanning direction, the visual field restriction device is configured to restrict a visual field on the intermediate imaging plane in the sub-scanning direction.

3. The image sensor unit according to claim 2, wherein the visual field restriction device is comprised of a slit that extends in the main scanning direction and has a predetermined width in the sub-scanning direction.

4. The image sensor unit according to claim 2, wherein the visual field restriction device is comprised of a mirror that extends in the main scanning direction and has a predetermined width in the sub-scanning direction.

5. The image sensor unit according to claim 4, wherein the first erecting equal-magnification lens array and the second erecting equal-magnification lens array are arranged such that an angle formed by the respective optical axes is a predetermined angle.

6. The image sensor unit according to claim 1, wherein the linear light source outputs a light with a first wavelength at first point of time and outputs a light with a second wavelength different from the first wavelength at a second point of time.

7. An image reading device comprising:
   the image sensor unit according to claim 1; and
   an image processing unit that processes data detected by the image sensor unit.

* * * * *